United States Patent
Liang et al.

(10) Patent No.: US 11,641,256 B2
(45) Date of Patent: *May 2, 2023

(54) GROUPING AND USE OF SHORT SEQUENCE SIGNALS

(71) Applicant: ZTE Corporation, Guangdong (CN)

(72) Inventors: Chunli Liang, Shenzhen (CN);
Shuqiang Xia, Shenzhen (CN);
Zhisong Zuo, Shenzhen (CN);
Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,758

(22) Filed: Oct. 10, 2022

(65) Prior Publication Data

US 2023/0048154 A1 Feb. 16, 2023

Related U.S. Application Data

(63) Continuation of application No. 16/872,303, filed on May 11, 2020, now Pat. No. 11,469,847, which is a
(Continued)

(30) Foreign Application Priority Data

Nov. 10, 2017 (WO) ................ PCT/CN2017/110525

(51) Int. Cl.
*H04L 5/00* (2006.01)
*H04J 13/00* (2011.01)
(Continued)

(52) U.S. Cl.
CPC ........ *H04L 5/0021* (2013.01); *H04J 13/0062* (2013.01); *H04L 25/03178* (2013.01);
(Continued)

(58) Field of Classification Search
CPC ...... H04J 13/0062; H04J 11/005; H04J 13/16; H04L 25/03178; H04L 27/2613;
(Continued)

(56) References Cited

U.S. PATENT DOCUMENTS 10,375,734 B2 8/2019 Suzuki et al.
2003/0112857 A1 6/2003 Cleveland
(Continued)

FOREIGN PATENT DOCUMENTS

CA 3082232 A1 5/2019
CN 1429440 A 7/2003
(Continued)

OTHER PUBLICATIONS

"Physical channels and modulation (Release 13)," 3GPP TS 36.211 V13.7.0 (Sep. 2017).
(Continued)

*Primary Examiner* — Justin T Van Roie
(74) *Attorney, Agent, or Firm* — Perkins Coie LLP

(57) ABSTRACT

New sequences have been proposed and/or adopted for short Physical Uplink Control Channel communications between base stations and UEs. In an exemplary embodiment, a UE communicates with a base station based on sequence groups that include the new sequences, where the new sequences are allocated to different sequence groups based, at least in part, on correlations with other existing sequences included in individual sequence groups.

20 Claims, 5 Drawing Sheets

Related U.S. Application Data continuation of application No. PCT/CN2018/076298, filed on Feb. 11, 2018.

(51) Int. Cl.
  *H04L 25/03*  (2006.01)
  *H04L 27/26*  (2006.01)
  *H04W 72/21*  (2023.01)

(52) U.S. Cl.
  CPC ...... *H04L 27/2613* (2013.01); *H04L 27/2692* (2013.01); *H04W 72/21* (2023.01)

(58) Field of Classification Search
  CPC ............. H04L 27/2692; H04L 5/0021; H04W 72/0413; H04W 72/21
  See application file for complete search history.

(56) References Cited

U.S. PATENT DOCUMENTS

| | | |
|---|---|---|
| 2009/0046645 A1 | 2/2009 | Bertrand et al. |
| 2012/0076100 A1 | 3/2012 | Noh et al. |
| 2014/0247799 A1 | 9/2014 | Suzuki et al. |
| 2015/0372780 A1 | 12/2015 | Qu et al. |
| 2016/0125130 A1 | 5/2016 | Le Cocq et al. |
| 2017/0041892 A1 | 2/2017 | Xia et al. |
| 2017/0041930 A1 | 2/2017 | Imamura et al. |
| 2017/0170922 A1 | 6/2017 | Noh et al. |
| 2019/0104007 A1 | 4/2019 | Wang et al. |
| 2019/0215122 A1 | 7/2019 | Gong et al. |
| 2020/0274630 A1 | 8/2020 | Liang et al. |
| 2020/0396113 A1 | 12/2020 | Liang et al. |
| 2022/0216933 A1 | 7/2022 | Liang et al. |

FOREIGN PATENT DOCUMENTS

| | | |
|---|---|---|
| CN | 101179860 A | 5/2008 |
| CN | 101330321 A | 12/2008 |
| CN | 101341786 A | 1/2009 |
| CN | 102238747 A | 11/2011 |
| CN | 102983957 A | 3/2013 |
| CN | 103139916 A | 6/2013 |
| CN | 105680979 A | 6/2016 |
| CN | 106134140 A | 11/2016 |
| CN | 106973402 A1 | 7/2017 |
| CN | 107222282 A1 | 9/2017 |
| CN | 109245871 A1 | 1/2019 |
| EP | 3684021 A1 | 7/2020 |
| JP | 2012-527154 A | 11/2012 |
| JP | 2013-081055 A | 5/2013 |
| KR | 10-2012-0023200 A | 3/2012 |
| KR | 10-1520682 B1 | 5/2015 |
| WO | 2008155907 A1 | 12/2008 |
| WO | 2013079009 A1 | 6/2013 |
| WO | 2015149301 A1 | 10/2015 |
| WO | 2018060969 A1 | 4/2018 |
| WO | 2019047622 A1 | 3/2019 |

OTHER PUBLICATIONS

"Physical channels and modulation (Release 15)," 3GPP TS 38.211 V1.1.0 (Oct. 2017).
CATT, "On short PUCCH design for up to two UCI bits," 3GPP TSG RAN WG1 Meeting 90bis, Prague, Czech Republic, R1-1717826, 5 pages, Oct. 2017.
CATT, "On short PUCCH formats supporting up to two UCI bits," 3GPP TSG RAN WG1 Meeting NR#3, Nagoya, Japan, R1-1715817, 4 pages, Sep. 2017.
Communication pursuant to Article 94(3) EPC for European Patent Application No. 17931303.6, dated Nov. 16, 2021 (6 pages).
Ericsson, "Summary of Short PUCCH structure (7.3.2.1)," 3GPP TSG RAN WG1 Meeting AH_NR#3, Nagoya, Japan, R1-1718862, 17 pages, Sep. 2017.
Extended European Search Report for European Patent Application No. 17931303.6, dated Oct. 12, 2020 (10 pages).
Extended European Search Report for European Patent Application No. 18876352.8, dated Jul. 16, 2021 (9 pages).
Final Examination Report for Singapore Patent Application No. 11202004262S, dated Feb. 28, 2022 (5 pages).
First Examination Report for Indian Patent Application No. 202047022529, dated Jun. 23, 2021.
First Examination Report for Indian Patent Application No. 202047022530, dated Dec. 2, 2021 (7 pages).
Huawei et al., "Long PUCCH for up to 2 bits UCI," 3GPP TSG RAN WG1 Meeting #90, Prague, Czech Republic, RI-1712192, 7 pages, Aug. 2017.
Huawei et al., "Short PUCCH for UCI of up to 2 bits," 3GPP TSG RAN WG1 Meeting AH_NR#3, Nagoya, Japan, R1-1715399, 17 pages, Sep. 2017.
Huawei, et al., "Discussion on grouping of CGS sequence," 3GPP TSG RAN WG1 Ad Hoc Meeting, Vancouver, Canada, R1-1800088, 8 pages, Jan. 2018.
Huawei, et al., "On CGS ordering for NR", 3GPP TSG RAN WG1 Meeting #92bis, Sanya, China, R1-1804433, 13 pages, Apr. 2018.
Intel Corporation, "Further discussion on SRS for NR," 3GPP TSG RAN WG1 NR Ad-Hoc meeting, Spokane, Washington, USA, R1-1700356, 8 pages, Jan. 2017.
International Search Report and Written Opinion dated Aug. 6, 2018 for International Application No. PCT/CN2018/076298, filed on Feb. 11, 2018 (9 pages).
International Search Report and Written Opinion dated Jul. 31, 2018 for International Application No. PCT/CN2017/110525, filed on Nov. 10, 2017 (7 pages).
Nokia, et al., "UL DMRS Base Sequences with IFDMA," 3GPP TSG RAN WG1 Meeting #86, Gothenburg, Sweden, R1-167087, 4 pages, Aug. 2016.
Notice of Allowance for Korean Patent Application No. 10-2020-7016379, dated Mar. 28, 2022 (6 pages).
Office Action for Canadian Patent Application No. 3,082,232, dated Aug. 17, 2021 (4 pages).
Office Action for Canadian Patent Application No. 3,082,236, dated Sep. 2, 2021 (4 pages).
Office Action for Chinese Patent Application No. 201780098147.0, dated Dec. 11, 2020.
Office Action for Chinese Patent Application No. 201880086147.3, dated Nov. 24, 2020.
Office Action for Chinese Patent Application No. 202110536388.7, dated Dec. 27, 2021 (10 pages).
Office Action for Japanese Patent Application No. 2020-525949, dated Nov. 9, 2021 (4 pages).
Office Action for Japanese Patent Application No. 2020-525979, dated Aug. 3, 2021, with English summary (6 pages).
Office Action for Korean Patent Application No. 10-2020-7016375, dated Jul. 14, 2022, with English summary (11 pages).
Office Action for Korean Patent Application No. 10-2020-7016379, dated Oct. 19, 2021 (6 pages).
Office Action for Singapore Patent Application No. 11202004262S, dated Sep. 27, 2021 (6 pages).
Search Report and Written Opinion for Singapore Patent Application No. 11202004267R, dated Apr. 27, 2021.
ZTE, et al., "On short PUCCH for up to 2 bits UCI," 3GPP TSG RAN WG1 Meeting #91, Reno, Nevada, USA, R1-1719672, 10 pages, Nov. 2017.
Office Action for Korean Patent Application No. 10-2022-7017467, dated Dec. 20, 2022 (7 pages).
Office Action for Chinese Patent Application No. 202110436474.0, dated Aug. 26, 2022 (12 pages).
Office Action for Korean Patent Application No. 10-2020-7016375, dated Jan. 17, 2023 (7 pages). English summary included.
Office Action for Canadian Patent Application No. 3,082,236, dated Jan. 18, 2023 (4 pages).
Communication pursuant to Article 94(3) EPC for European Patent Application No. 18876352.8, dated Jan. 27, 2023 (5 pages).
Communication pursuant to Article 94(3) EPC for European Patent Application No. 17931303.6, mailed Feb. 3, 2023 (5 pages).

GROUPING AND USE OF SHORT SEQUENCE SIGNALS

CROSS REFERENCE TO RELATED APPLICATIONS

This patent document is a continuation of and claims benefit of priority of U.S. Patent Application No. 16/872,303, filed May 11, 2020, now U.S. Pat. No. 11,469,847, which is a continuation of International Patent Application No. PCT/CN2018/076298, filed on Feb. 11, 2018, which claims benefit of priority to International Patent Application No. PCT/CN2017/110525, filed on Nov. 10, 2017. The entire content of the before-mentioned patent applications is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This disclosure relates to methods, systems, and devices for grouping and using short sequences in wireless communications, such as Physical Uplink Control Channel (PUCCH) and/or short PUCCH transmissions.

An exemplary embodiment discloses a method for wireless communication. The method comprises communicating with a wireless communication node based, at least in part, on a distinguished length-X sequence included in a distinguished sequence group, the distinguished sequence group selected from a plurality of sequence groups. The distinguished length-X sequence is a member of a target sequence set of length-X sequences, and each length-X sequence of the target sequence set is allocated to an individual sequence group of the plurality of sequence groups based, at least in part, on a first value of correlation between the length-X sequence and at least one length-Y sequence of the individual sequence group.

In some embodiments, the distinguished sequence group is selected based, at least in part, on identification of at least a cell, user, or communication channel.

In some embodiments, each length-X sequence of the target sequence set is a distinct length-12 sequence. In some embodiments, each distinct length-12 sequence corresponds to a mathematical form of:

$$r(n)=e^{j\pi\varphi(n)/4}, n=0,1,2,\ldots,11.$$

In some embodiments, each length-X sequence of the target sequence set is a distinct length-18 sequence. In some embodiments, each distinct length-18 sequence corresponds to a mathematical form of:

$$r(n)e^{j\pi\varphi(n)/4}, n=0,1,2,\ldots,17.$$

In some embodiments, each length-X sequence of the target sequence set is a distinct length-24 sequence. In some embodiments, each distinct length-24 sequence corresponds to a mathematical form of:

$$r(n)e^{j\ \pi\varphi(n)/4}, n=0,1,2,\ldots,23$$

In some embodiments, communicating with the wireless communication node comprises using the distinguished length-X sequence for transmitting wireless signals to the wireless communication node or receiving wireless signals from the wireless communication node. In some embodiments, the wireless communication node is a user equipment (UE) or a base station.

In some embodiments, the value of correlation between the length-X sequence and the at least one length-Y sequence is calculated based on:

xcorr_coeffs=NFFT*IFFT(Seq1.*conj(Seq2),NFFT)/length(Seq1)

wherein, IFFT(X,N) is the N_point Inverse Fourier Transform operation, Seq1 denotes the length-X sequence, Seq2 denotes the length-Y sequence, and conj( )is the complex conjugate operation.

In some embodiments, each length-X sequence of the target sequence set is allocated to an individual sequence group of the plurality of sequence groups further based on a comparison of (1) the first value of correlation between the length-X sequence and the at least one length-Y sequence of the individual sequence group and (2) at least a value of correlation between the length-X sequence and one or more sequences of another sequence group.

In some embodiments, Y>X and Y=12 N, and N is an integer larger than 0.

In some embodiments, when X=24, the length-Y sequence is a sequence that corresponds to a mathematical form of:

$$\bar{r}_{u,v}(n)=x_q(n \bmod N_{ZC}^{RS}), 0 \leq n < M_{sc}^{RS},$$

wherein the $q^{th}$ root Zadoff-Chu sequence is defined by:

$$x_q(m) = e^{-j\frac{\pi q m(m+1)}{N_{ZC}^{RS}}}, 0 \leq m \leq N_{ZC}^{RS} - 1$$

wherein q is given by:

$$q=\lfloor \bar{q}+1/2 \rfloor + v(-1)^{\lfloor 2\bar{q} \rfloor}$$

$$\bar{q}=N_{ZC}^{RS} \cdot (u+1)/31, \text{ and}$$

wherein the length $N_{ZC}^{RS}$ of the Zadoff-Chu sequence is given by the largest prime number such that $N_{ZC}^{RS} < M_{sc}^{RS}$ where $M_{SC}^{RS}=Y$, v=0 or 1 when Y>=60.

In some embodiments, when Y=36, for each length-X sequence of a subset of the target sequence set: the length-X sequence is allocated to an individual sequence group of the plurality of sequence groups based further on a second value of correlation between the length-X sequence and at least one length-Z sequence of the individual sequence group, the first value of correlation between the length-X sequence and the at least one length-Y sequence of the individual sequence group has a higher priority than the second value of correlation. In some embodiments, for each length-X sequence of a further subset of the subset of the target sequence set: the length-X sequence is allocated to an individual sequence group of the plurality of sequence groups based further on a third value of correlation between the length-X sequence and at least one length-P sequence of the individual sequence group, wherein P is larger than Z, and the second value of correlation between the length-X sequence and the at least one length-Z sequence of the individual sequence group has a higher priority than the third value of correlation.

In some embodiments, when X=24, each distinct length-X sequence of the target sequence set corresponds to a mathematical form of $r(n)=e^{j\pi\varphi(n)/4}$, n=0,1,2, ... 23, each sequence group of the plurality of sequence groups is associated with a distinct group index u, and each distinct length-X sequence is allocated to an individual sequence group in accordance with a relationship between values of $\varphi(n)$ and the group indices as shown in the table below.

| Group index u | $\varphi(0), \varphi(1), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | -3 | 3 | -1 | 3 | 1 | 3 | -1 | 1 | -3 | -1 | -3 | -1 | 1 | 3 | -3 | -1 | -3 | 3 | 3 | 3 | -3 | -3 | -3 |
| 1 | -3 | -1 | 1 | -3 | -1 | -1 | 1 | 1 | 1 | 3 | 3 | -1 | 1 | -1 | 1 | -1 | -1 | -3 | -3 | -3 | 3 | 1 | -1 | -3 |
| 2 | -1 | -3 | -3 | 1 | -1 | -1 | -3 | 1 | 3 | -1 | -3 | -1 | -1 | 1 | 1 | 3 | 1 | -3 | -1 | -1 | 3 | -3 | -3 | -3 |
| 3 | 1 | -3 | 3 | -1 | -3 | -1 | 3 | 3 | 1 | -1 | 1 | 1 | 3 | -3 | -1 | -3 | -3 | -3 | -1 | 3 | -3 | -1 | -3 | -3 |
| 4 | -1 | 3 | -3 | -3 | -1 | 3 | -1 | -1 | 1 | 3 | 1 | 3 | -1 | -1 | -3 | 1 | 3 | 1 | -1 | -3 | 1 | -1 | -3 | -3 |
| 5 | -3 | 1 | -3 | 3 | -3 | 1 | -3 | 3 | 1 | -1 | -3 | -1 | -3 | -3 | -3 | -3 | 1 | 3 | -1 | 1 | 3 | 3 | 3 | -3 |
| 6 | -3 | 3 | 1 | 3 | -1 | 1 | -3 | 1 | -1 | 1 | -3 | -3 | -3 | -3 | -1 | -1 | -1 | 1 | 1 | -3 | -3 |
| 7 | -3 | 1 | 3 | -1 | 1 | -1 | 3 | -3 | 3 | -1 | -3 | -1 | -3 | 3 | -1 | -1 | -1 | -3 | -1 | -3 | 3 | 3 | -3 |
| 8 | -3 | 1 | -3 | 3 | -1 | -1 | -1 | -3 | 3 | 1 | -1 | -3 | -1 | 1 | 3 | -1 | 1 | -1 | 1 | -3 | -3 | -3 | -3 | -3 |
| 9 | 1 | 1 | -1 | -3 | -1 | 1 | 1 | -3 | 1 | -1 | 1 | -3 | 3 | -3 | -3 | 3 | -1 | -3 | 1 | 3 | -3 | 1 | -3 | -3 |
| 10 | -3 | -3 | -3 | -1 | 3 | -3 | 3 | 1 | 3 | 1 | -3 | -1 | -1 | -1 | 1 | 1 | 3 | 1 | -1 | -3 | 3 | 1 | 3 | -3 |
| 11 | -3 | 3 | -1 | 3 | 1 | -1 | -1 | -1 | 3 | 3 | 1 | 1 | 1 | 3 | 3 | 1 | -3 | -3 | -1 | 1 | -3 | 1 | 3 | -3 |
| 12 | 3 | -3 | 3 | -1 | -3 | 1 | 3 | 1 | -1 | -1 | -3 | -1 | 3 | -3 | 3 | -1 | -1 | 3 | 3 | -3 | -3 | 3 | -3 | -3 |
| 13 | -3 | 3 | -1 | 3 | -1 | 3 | 3 | 1 | 1 | -3 | 1 | 3 | -3 | 3 | -3 | -3 | -1 | 1 | 3 | -3 | -1 | -1 | -3 | -3 |
| 14 | -3 | 1 | -3 | -1 | -1 | 3 | 1 | 3 | -3 | 1 | -1 | 3 | 3 | -1 | -3 | 3 | -3 | -1 | -1 | -3 | -3 | -3 | 3 | -3 |
| 15 | -3 | -1 | -1 | -3 | 1 | -3 | -3 | -1 | -1 | 3 | -1 | 1 | -1 | 3 | 1 | -3 | -1 | 3 | 1 | 1 | -1 | -1 | -3 | -3 |
| 16 | -3 | -3 | 1 | -1 | 3 | 3 | -3 | -1 | 1 | -1 | -1 | 1 | 1 | -1 | -1 | 3 | -3 | 1 | -1 | -1 | -1 | -1 | -1 | -3 |
| 17 | 3 | -1 | 3 | -1 | 1 | -3 | 1 | 1 | -3 | -3 | 3 | -3 | -1 | -1 | -1 | -1 | -1 | -3 | -3 | -1 | 1 | 1 | -3 | -3 |
| 18 | -3 | 1 | -3 | 1 | -3 | -3 | 1 | -3 | 1 | -3 | -3 | -3 | -3 | -3 | 1 | -3 | -3 | 1 | 1 | -3 | 1 | 1 | -3 | -3 |
| 19 | -3 | -3 | 3 | 3 | 1 | -1 | -1 | -1 | 1 | -3 | -1 | 1 | -1 | 3 | -3 | -1 | -3 | -1 | -1 | 1 | -3 | 3 | -1 | -3 |
| 20 | -3 | -3 | -1 | -1 | -1 | -3 | 1 | -1 | -3 | -1 | 3 | -3 | 1 | -3 | 3 | -3 | 3 | 3 | 1 | -1 | -1 | 1 | -3 | -3 |
| 21 | 3 | -1 | 1 | -1 | 3 | -3 | 1 | 1 | 3 | -1 | -3 | 3 | 1 | -3 | 3 | -1 | -1 | -1 | -1 | 1 | -3 | -3 | -3 | -3 |
| 22 | -1 | 3 | -1 | -1 | 3 | 3 | -1 | -1 | -1 | 3 | -1 | -3 | 1 | 3 | 1 | 1 | -3 | -3 | -3 | -1 | -3 | -1 | -3 | -3 |
| 23 | -1 | -3 | 3 | 1 | 1 | -3 | 1 | -3 | -3 | 1 | -3 | -1 | -1 | 3 | -3 | 3 | 3 | 3 | -3 | 1 | 3 | 3 | -3 | -3 |
| 24 | -3 | -1 | 1 | -3 | -3 | 1 | 1 | -3 | 3 | -1 | -1 | -3 | 1 | 3 | 1 | -1 | -3 | -1 | -3 | 1 | -3 | -3 | -3 | -3 |
| 25 | -3 | 3 | -1 | -3 | -1 | -1 | -1 | 3 | -1 | -1 | 3 | -3 | -1 | 3 | -3 | 3 | -3 | -1 | 3 | 1 | 1 | -1 | -3 | -3 |
| 26 | -3 | 1 | -1 | -3 | -3 | -1 | 1 | -3 | -1 | -3 | 1 | 1 | -1 | 1 | 1 | 3 | 3 | 3 | -1 | 1 | -1 | 1 | -1 | -3 |
| 27 | 3 | -3 | -3 | -1 | 3 | 3 | -3 | -1 | 3 | 1 | 1 | 1 | 3 | -1 | 3 | -3 | -1 | 3 | -1 | 3 | 1 | -1 | -3 | -3 |
| 28 | -3 | 1 | -3 | 1 | -3 | 1 | 1 | 3 | 1 | -3 | -3 | -1 | 1 | 3 | -1 | -3 | 3 | 1 | -1 | -3 | -3 | -3 | -3 | -3 |
| 29 | 3 | -3 | -1 | 1 | 3 | -1 | -1 | -3 | -1 | 3 | -1 | -3 | -1 | -3 | 3 | -1 | 3 | 1 | 1 | -3 | 3 | -3 | -3 | -3 |

In some embodiments, only 1 sequence pair between a length-24 sequence in any sequence group of the plurality of sequence groups and a length-36 sequence in any other sequence group of the plurality of sequence groups has a corresponding value of cross correlation that exceeds 0.6.

In some embodiments, only 3 sequence pairs between a length-24 sequence in any sequence group of the plurality of sequence groups and a length-60 sequence in any other sequence group of the plurality of sequence groups has a corresponding value of cross correlation that exceeds 0.6.

In some embodiments, only 3 sequence pairs between a length-24 sequence in any sequence group of the plurality of sequence groups and a length-72 sequence in any other sequence group of the plurality of sequence groups has a corresponding value of cross correlation that exceeds 0.6.

In some embodiments, when X=18, each distinct length-X sequence of the target sequence set corresponds to a mathematical form of $r(n)=e^{j\pi\varphi(n)/4}$, n=0,1,2, ..., 17, each sequence group of the plurality of sequence groups is associated with a distinct group index u, and each distinct length-X sequence is allocated to an individual sequence group in accordance with a relationship between values of $\varphi(n)$ and the group indices as shown in the table below.

| Group index u | φ(0), φ(1), ..., φ(17) | | | | | | | | | | | | | | | | | |
|---|---|---|---|---|---|---|---|---|---|---|---|---|---|---|---|---|---|---|
| 0 | -1 | 3 | -1 | -3 | 3 | 1 | -3 | -1 | 3 | -3 | -1 | -1 | 1 | 1 | 1 | -1 | -1 | -1 |
| 1 | 3 | -3 | 3 | -1 | 1 | 3 | -3 | -1 | -3 | -3 | -1 | -3 | 3 | 1 | -1 | 3 | -3 | 3 |
| 2 | -3 | -3 | 1 | -3 | 3 | 3 | 3 | -1 | 3 | 1 | 1 | -3 | -3 | 3 | -3 | -1 | -1 |
| 3 | -3 | -3 | 3 | 3 | 3 | 1 | -3 | 1 | 3 | 3 | 1 | -3 | -3 | 3 | -1 | -3 | -1 | 1 |
| 4 | 1 | 1 | -1 | -1 | -3 | -1 | 1 | -3 | -3 | -3 | 1 | -3 | -1 | -1 | 1 | -1 | 3 | 1 |
| 5 | -3 | -3 | 1 | -1 | -1 | 1 | 1 | -3 | -1 | 3 | 3 | 3 | -1 | 3 | 1 | 3 | 1 |
| 6 | -3 | 3 | -1 | 1 | 3 | 1 | -3 | -1 | 1 | 1 | -3 | 1 | 3 | 3 | -1 | -3 | -3 | -3 |
| 7 | 1 | 1 | -3 | 3 | 3 | 1 | 3 | -3 | 3 | -1 | 1 | 1 | -1 | 1 | -3 | -3 | -1 | 3 |
| 8 | -3 | -1 | 3 | 3 | -1 | 3 | -1 | -3 | -1 | 1 | -1 | -3 | -1 | -1 | -1 | 3 | 3 | 1 |
| 9 | 3 | -1 | 3 | 1 | -3 | -3 | -1 | 1 | -3 | -3 | 3 | 3 | 3 | 1 | 3 | -3 | 3 | -3 |
| 10 | -3 | -3 | -3 | 1 | -3 | 3 | 1 | 1 | 3 | -3 | -3 | 1 | 3 | -1 | 3 | -3 | -3 | 3 |
| 11 | -3 | 1 | -3 | -3 | 1 | -3 | -3 | 3 | 1 | -3 | -1 | -3 | -3 | -3 | -1 | 1 | 1 | 3 |
| 12 | -3 | -1 | -3 | -3 | 1 | 1 | -1 | -3 | -1 | -3 | -1 | -1 | 3 | 3 | -1 | 3 | 1 | 3 |
| 13 | 1 | 1 | -3 | -3 | -3 | -3 | 1 | 3 | -3 | 3 | 3 | 1 | -3 | -1 | 3 | -1 | -3 | 1 |
| 14 | -3 | 3 | -1 | -3 | -1 | -3 | 1 | 1 | -3 | -3 | -1 | -1 | 3 | -3 | 1 | 3 | 1 | 1 |
| 15 | -3 | -3 | 3 | 3 | 3 | -1 | -1 | -3 | -1 | -1 | -1 | 3 | 1 | -3 | -3 | -1 | 3 | -1 |
| 16 | -3 | -1 | -3 | -1 | -3 | 1 | 3 | -3 | -1 | 3 | 3 | 3 | 1 | -1 | -3 | 3 | -1 | -3 |
| 17 | -1 | -3 | 1 | -3 | -3 | -3 | 1 | 1 | 3 | 3 | -3 | 3 | 3 | -3 | -1 | 3 | -3 | 1 |
| 18 | -3 | 1 | -3 | -1 | -1 | 3 | 1 | -3 | -3 | -3 | -1 | -3 | -3 | 1 | 1 | 1 | -1 | -1 |
| 19 | 3 | 3 | 3 | -3 | -1 | -3 | -1 | 3 | -1 | 1 | -1 | -3 | 1 | -3 | -3 | -1 | 3 | 3 |
| 20 | -3 | 1 | 1 | -3 | 1 | 1 | 3 | -3 | -1 | -3 | -1 | 3 | -3 | 3 | -1 | -1 | -1 | -3 |
| 21 | -3 | 3 | 1 | -1 | -1 | 3 | -3 | -1 | 1 | 1 | 1 | 1 | 1 | -1 | 3 | -1 | -3 | -1 |
| 22 | -3 | -1 | -1 | -3 | 1 | -3 | 3 | -1 | -1 | -3 | 3 | 3 | -3 | -1 | 3 | -1 | -1 | -1 |
| 23 | 3 | -1 | -3 | 1 | -3 | -3 | 3 | 3 | -1 | 1 | -3 | -1 | 3 | 1 | 1 | 3 | 3 |
| 24 | 3 | -3 | 1 | 1 | 3 | -1 | 1 | -1 | -1 | -3 | 1 | 1 | -1 | 3 | 3 | -3 | 3 | -1 |
| 25 | 3 | -1 | -1 | 1 | -3 | -1 | -3 | -1 | -3 | -3 | -1 | -3 | 1 | 1 | 1 | -3 | -3 | 3 |
| 26 | 1 | -3 | -1 | -3 | 3 | 3 | -1 | -3 | 1 | -3 | -3 | -1 | -1 | 1 | 3 | 3 | 3 |
| 27 | -3 | -3 | 3 | 3 | -3 | 1 | 3 | -1 | -3 | 1 | -1 | -3 | -3 | -1 | -1 | -1 | 3 |
| 28 | 3 | 1 | -3 | 1 | -3 | 3 | 3 | -1 | -3 | -3 | -1 | -3 | -3 | 3 | -3 | -1 | 1 | 3 |
| 29 | -3 | 3 | 1 | -1 | -1 | -1 | -1 | 1 | -1 | 3 | 3 | -3 | -1 | 1 | 3 | -1 | 3 | -1 |

In some embodiments, only 2 sequence pair between a length-18 sequence in any sequence group of the plurality of sequence groups and a length-24 sequence in any other sequence group of the plurality of sequence groups has a corresponding value of cross correlation that exceeds 0.7.

In some embodiments, only 2 sequence pairs between a length-18 sequence in any sequence group of the plurality of sequence groups and a length-36 sequence in any other sequence group of the plurality of sequence groups has a corresponding value of cross correlation that exceeds 0.7.

In some embodiments, only 3 sequence pairs between a length-18 sequence in any sequence group of the plurality of sequence groups and a length-60 sequence in any other sequence group of the plurality of sequence groups has a corresponding value of cross correlation that exceeds 0.7.

In some embodiments, only 3 sequence pairs between a length-18 sequence in any sequence group of the plurality of sequence groups and a length-72 sequence in any other sequence group of the plurality of sequence groups has a corresponding value of cross correlation that exceeds 0.7.

In some embodiments, when X=12, each distinct length-X sequence of the target sequence set corresponds to a mathematical form of $r(n)=e^{j\pi\varphi(n)/4}$, n=0,1,2,...,11, each sequence group of the plurality of sequence groups is associated with a distinct group index u, and each distinct length-X sequence is allocated to an individual sequence group in accordance with a relationship between values of φ(n) and the group indices as shown in the table below.

| Group index u | φ(0), φ(1), ..., φ(11) | | | | | | | | | | | |
|---|---|---|---|---|---|---|---|---|---|---|---|---|
| 0 | -3 | -1 | -1 | 1 | 3 | 1 | 1 | -1 | 1 | -1 | -3 | 1 |
| 1 | -3 | 3 | 1 | -3 | 1 | 3 | -1 | -1 | 1 | 3 | 3 | 3 |
| 2 | -3 | 3 | 3 | 1 | -3 | 3 | -1 | 1 | 3 | -3 | 3 | -3 |
| 3 | -3 | -3 | 3 | -3 | -1 | 3 | 3 | 3 | -1 | -3 | 1 | -3 |
| 4 | -3 | -3 | -1 | 3 | 3 | 3 | -3 | 3 | -3 | 1 | -1 | -3 |
| 5 | -3 | 1 | -3 | -3 | -3 | 3 | -3 | -1 | 1 | 1 | 1 | -3 |
| 6 | 1 | -1 | 3 | -1 | -1 | -1 | -3 | -1 | 1 | 1 | 1 | -3 |
| 7 | -1 | -3 | 3 | -1 | -3 | -3 | -3 | -1 | 1 | -1 | 1 | -3 |
| 8 | -1 | 1 | 1 | -1 | 1 | 3 | 3 | -1 | -1 | -3 | 1 | -3 |
| 9 | -3 | 3 | 1 | 3 | -3 | 1 | 1 | 1 | 1 | 3 | -3 | 3 |
| 10 | -3 | 3 | -3 | 3 | 3 | -3 | -1 | -1 | 3 | 3 | 1 | -3 |
| 11 | -3 | -3 | 3 | 1 | -3 | -3 | -1 | 3 | -1 | 1 | 3 |
| 12 | -3 | -1 | 3 | -3 | -3 | -1 | -3 | 1 | -1 | -3 | 3 | 3 |
| 13 | -3 | 1 | -1 | -1 | 3 | 3 | -3 | -1 | -3 | -1 | -3 |
| 14 | -3 | -1 | 3 | 1 | -3 | -1 | -3 | 3 | 1 | 3 | 3 | 1 |
| 15 | -3 | 1 | 3 | -1 | -3 | -3 | -1 | -1 | 3 | 1 | -3 |
| 16 | -1 | -1 | -1 | -1 | 1 | -3 | -1 | 3 | 3 | -1 | -3 | 1 |
| 17 | -3 | -1 | -1 | -3 | -3 | -1 | -3 | 3 | 1 | 3 | -1 | -3 |
| 18 | -3 | 1 | 3 | 3 | -1 | -1 | 3 | 3 | -3 | 3 | -3 |
| 19 | -3 | -1 | -3 | -1 | -1 | -3 | 3 | 3 | -1 | -1 | 1 | -3 |
| 20 | 3 | 1 | 3 | 1 | 3 | -3 | -1 | 1 | 3 | 1 | -1 | -3 |
| 21 | 1 | 3 | -3 | 1 | 3 | 3 | 3 | 1 | -1 | 1 | -1 | 3 |
| 22 | -3 | 3 | 3 | 3 | -1 | -3 | -3 | -1 | -3 | 1 | 3 | -3 |
| 23 | 3 | -1 | -3 | 3 | -3 | 1 | 3 | 3 | -3 | -1 | 3 | -3 |
| 24 | -3 | -1 | 1 | -3 | 1 | 3 | 3 | -1 | -3 | 3 | 3 |
| 25 | -3 | 3 | 1 | -1 | 3 | 3 | -3 | 1 | -1 | -1 | 1 |
| 26 | -1 | 1 | 3 | -3 | 1 | -1 | 1 | -1 | -3 | 1 | -1 |
| 27 | -3 | -3 | 3 | 3 | 3 | -3 | -1 | 1 | -3 | 3 | 1 | -3 |
| 28 | 1 | -1 | 3 | 1 | 1 | -1 | -1 | -1 | 1 | 3 | -3 | 1 |
| 29 | -3 | 3 | -3 | 3 | -3 | -3 | 3 | -1 | -1 | 1 | 3 | -3 |

In some embodiments, only 9 sequence pair between a length-12 sequence in any sequence group of the plurality of sequence groups and a length-18 sequence in any other sequence group of the plurality of sequence groups has a corresponding value of cross correlation that exceeds 0.8.

In some embodiments, only 3 sequence pair between a length-12 sequence in any sequence group of the plurality of sequence groups and a length-24 sequence in any other sequence group of the plurality of sequence groups has a corresponding value of cross correlation that exceeds 0.8.

In some embodiments, only 2 sequence pairs between a length-12 sequence in any sequence group of the plurality of sequence groups and a length-36 sequence in any other sequence group of the plurality of sequence groups has a corresponding value of cross correlation that exceeds 0.8.

In some embodiments, only 1 sequence pairs between a length-12 sequence in any sequence group of the plurality of sequence groups and a length-48 sequence in any other sequence group of the plurality of sequence groups has a corresponding value of cross correlation that exceeds 0.8.

In some embodiments, only 5 sequence pairs between a length-12 sequence in any sequence group of the plurality of sequence groups and a length-60 sequence in any other sequence group of the plurality of sequence groups has a corresponding value of cross correlation that exceeds 0.8.

In some embodiments, only 5 sequence pairs between a length-12 sequence in any sequence group of the plurality of sequence groups and a length-72 sequence in any other sequence group of the plurality of sequence groups has a corresponding value of cross correlation that exceeds 0.8.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 3A and 3B show two examples of zeros padding application, in accordance with some embodiments of the presently disclosed technology.

DETAILED DESCRIPTION

Figure 1:
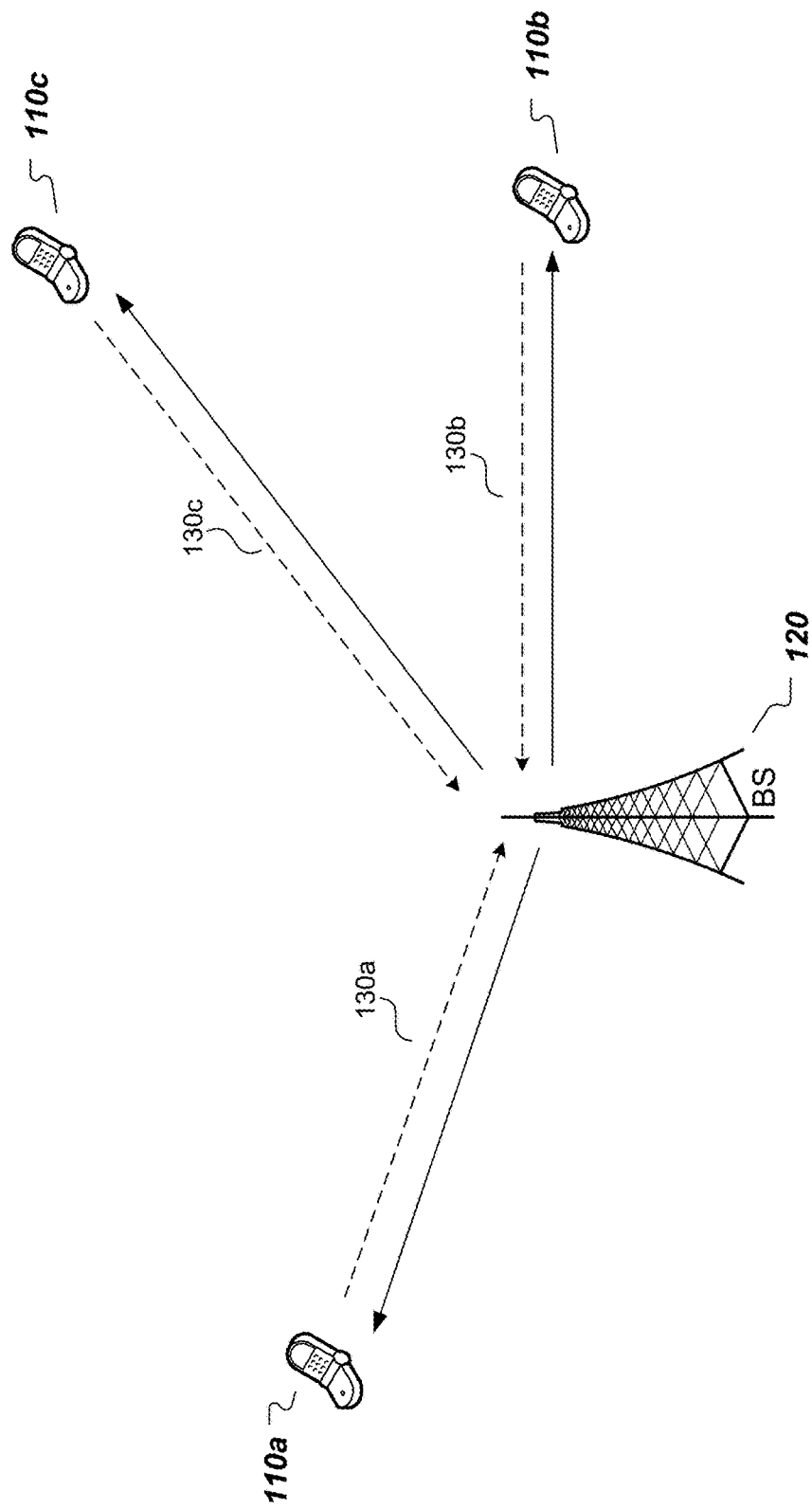
FIG. 1 shows an exemplary base station and UEs in wireless communication that uses PUCCH and/or short PUCCH channels, in accordance with some embodiments of the presently disclosed technology.

In the 4th Generation (4G) mobile communication technology of LTE/LTE-A and the 5th Generation (5G) mobile communication technology, more complex and sophisticated range of access requirements and flexibilities are provided or being developed. Currently, enhanced mobile broadband (eMBB), ultra high reliability and low latency communication (URLLC), and massive machine type communications (mMTC) are under study and/or in development for both 4G and 5G systems.

New Radio (NR) technology, currently under standardization in 5G, has proposed the use of short PUCCH transmissions. More specifically, this disclosure relates to the grouping and use of new short sequences that are orthogonal and meet performance requirements of the short PUCCH under consideration in the 3GPP standards organization.

The PUCCH or short PUCCH is a wireless channel used to transmit information from mobile stations or user equipment (UE) to a base station. For example, the UE may use the PUCCH to transmit information such as an Acknowledgement (ACK), Non-Acknowledgement (NACK), and scheduling request (SR). The UE can transmit ACK/NACK to the base station to inform the base station whether the UE has properly decoded the data transmitted by the base station. A scheduling request (SR) is used by the UE to request uplink resources to transmit data.

In the standardization of NR, it has been agreed that sequences with low peak to average power ratio (PAPR) be adopted for short PUCCH to carry up to 2 bits of uplink control information (UCI). In comparison, LTE adopted computer generated constant amplitude zero auto correlation (CG-CAZAC) sequences with lengths of 12 and 24 for 1 or 2 resource blocks (RBs) and adopted cyclic extension of Zad-off Chu (ZC) sequences for 3 or more RBs. The NR sequence requirements are more stringent (e.g., requiring a lower cubic metric/peak to average power ratio (CM/PAPR)). The length-12, length-18, and length-24 sequences currently used in LTE may not satisfy these new requirements. Therefore, new sequences with low CM/PAPR have been proposed. In the 3GPP RAN1 90 bis meeting, a set of 30 length-12 base sequences for short PUCCH has been adopted for NR. The set of length-12 sequences can be expressed as:

$$r(n)=e^{j\pi\varphi(n)/4}, n=0,1,2,\ldots,11$$

where $\varphi(n)$ is listed in Table-1 below.

TABLE 1 definition of $\varphi(n)$ for the length-12 sequences adopted for NR

| i | $\varphi(0), \ldots, \varphi(11)$ | | | | | | | | | | | |
|---|---|---|---|---|---|---|---|---|---|---|---|---|
| 0 | 1 | −1 | 3 | 1 | 1 | −1 | −1 | −1 | 1 | 3 | −3 | 1 |
| 1 | −1 | −1 | −1 | −1 | 1 | −3 | −1 | 3 | 3 | −1 | −3 | 1 |
| 2 | −3 | 1 | −3 | −3 | −3 | 3 | −3 | −1 | 1 | 1 | 1 | −3 |
| 3 | −3 | 3 | 1 | 3 | −3 | 1 | 1 | 1 | 1 | 3 | −3 | 3 |
| 4 | −3 | 1 | 3 | −1 | −1 | −3 | −3 | −1 | −1 | 3 | 1 | −3 |
| 5 | −1 | 1 | 1 | −1 | 1 | 3 | 3 | −1 | −1 | −3 | 1 | −3 |
| 6 | −3 | −3 | −1 | 3 | 3 | 3 | −3 | 3 | 1 | −1 | 1 | −3 |
| 7 | −3 | 3 | −3 | 3 | 3 | −3 | −1 | −1 | 3 | 3 | 1 | −3 |
| 8 | −3 | −1 | −3 | −1 | −1 | −3 | 3 | 3 | −1 | −1 | 1 | −3 |
| 9 | −3 | 3 | 3 | 3 | −1 | −3 | −3 | −1 | −3 | 1 | 3 | −3 |
| 10 | 1 | 3 | −3 | 1 | 3 | 3 | 3 | 1 | −1 | 1 | −1 | 3 |
| 11 | −1 | −3 | 3 | −1 | −3 | −3 | −3 | −1 | 1 | −1 | 1 | −3 |
| 12 | 3 | 1 | 3 | 1 | 3 | −3 | −1 | 1 | 3 | 1 | −1 | −3 |
| 13 | −3 | −3 | 3 | 3 | 3 | −3 | −1 | 1 | −3 | 3 | 1 | −3 |
| 14 | −3 | −1 | 1 | −3 | 1 | 3 | 3 | 3 | −1 | −3 | 3 | 3 |
| 15 | −3 | −3 | 3 | 1 | −3 | −3 | −3 | −1 | 3 | −1 | 1 | 3 |
| 16 | −1 | 1 | 3 | −3 | 1 | −1 | 1 | −1 | −1 | −3 | 1 | −1 |
| 17 | −3 | −1 | −1 | 1 | 3 | 1 | 1 | −1 | 1 | −1 | −3 | 1 |
| 18 | −3 | −1 | 3 | −3 | −3 | −1 | −3 | 1 | −1 | −3 | 3 | 3 |
| 19 | −3 | −3 | 3 | −3 | −3 | −1 | 3 | 3 | −1 | −3 | 1 | 3 |
| 20 | −3 | 1 | −1 | −1 | 3 | 3 | −3 | −1 | −1 | −3 | −1 | −3 |
| 21 | −3 | 1 | 3 | 3 | −1 | −1 | −3 | 3 | 3 | −3 | 3 | −3 |
| 22 | −3 | −1 | −1 | −3 | −3 | −1 | −3 | 3 | 1 | 3 | −1 | −3 |
| 23 | −3 | −1 | 3 | 1 | −3 | −1 | −3 | 3 | 1 | 3 | 3 | 1 |
| 24 | −3 | 3 | 3 | 1 | −3 | 3 | −1 | 1 | 3 | −3 | 3 | −3 |
| 25 | 3 | −1 | −3 | 3 | −3 | 1 | 3 | 3 | −3 | −1 | −3 |
| 26 | 1 | −1 | 3 | −1 | −1 | −1 | −3 | −1 | 1 | 1 | 1 | −3 |
| 27 | −3 | 3 | 1 | −3 | 1 | 3 | −1 | −1 | 1 | 3 | 3 | 3 |
| 28 | −3 | 3 | −3 | 3 | −3 | −3 | 3 | −1 | −1 | 1 | 3 | −3 |
| 29 | −3 | 3 | 1 | −1 | 3 | 3 | −3 | 1 | −1 | 1 | −1 | 1 |

And in the 3GPP RAN1 91 meeting, a set of 30 length-18 and a set of 30 length-24 base sequences have also been adopted for NR. The set of length-18 sequences can be expressed as:

$$r(n)e^{j\pi\varphi(n)/4}, n=0,1,2,\ldots,17$$

where $\varphi(n)$ is listed in Table-2 below.

TABLE 2 definition of φ(n) for the length-18 sequences adopted for NR

| i | φ(0), . . . , φ(17) |
|---|---|
| 0  | 3 −3 3 −1 1 3 −3 −1 −3 −3 −1 −3 3 1 −1 3 −3 3 |
| 1  | 3 −3 1 1 3 −1 1 −1 −1 −3 1 1 −1 3 3 −3 3 −1 |
| 2  | −3 3 −1 −3 −1 −3 1 1 −3 −3 −1 −1 3 −3 1 3 1 1 |
| 3  | 1 1 −1 −1 −3 −1 1 −3 −3 −3 1 −3 −1 −1 1 −1 3 1 |
| 4  | 1 1 −3 3 3 1 3 −3 3 −1 1 1 −1 1 −3 −3 −1 3 |
| 5  | −3 −3 1 −3 3 3 3 −1 3 1 1 −3 −3 −3 3 −3 −1 −1 |
| 6  | −1 3 −1 −3 3 1 −3 −1 3 −3 −1 −1 1 1 1 −1 −1 −1 |
| 7  | −3 1 −3 −3 1 −3 −3 3 1 −3 −1 −3 −3 −3 −1 1 1 3 |
| 8  | 1 −3 −1 −3 3 3 −1 −3 1 −3 −3 −1 −3 −1 1 3 3 3 |
| 9  | −3 3 1 −1 −1 −1 −1 1 −1 3 3 −3 −1 1 3 −1 3 −1 |
| 10 | −3 −3 1 −1 −1 1 1 −3 −1 3 3 3 3 −1 3 1 3 1 |
| 11 | −3 −3 3 3 −3 1 3 −1 −3 1 −1 −3 3 −3 −1 −1 −1 3 |
| 12 | −3 −3 3 3 3 1 −3 1 3 3 1 −3 −3 3 −1 −3 −1 1 |
| 13 | −3 3 −1 1 3 1 −3 −1 1 1 −3 1 3 3 −1 −3 −3 −3 |
| 14 | −3 1 −3 −1 −1 3 1 −3 −3 −3 −1 −3 −3 1 1 1 −1 −1 |
| 15 | −3 −3 3 3 3 −1 −1 −3 −1 −1 −1 3 1 −3 −3 −1 3 −1 |
| 16 | −3 −1 3 3 −1 3 −1 −3 −1 1 −1 −3 −1 −1 −1 3 3 1 |
| 17 | −3 −1 −3 −1 −3 1 3 −3 −1 3 3 3 1 −1 −3 3 −1 −3 |
| 18 | −3 3 1 −1 −1 3 −3 −1 1 1 1 1 1 −1 3 −1 −3 −1 |
| 19 | 3 −1 −3 1 −3 −3 −3 3 3 −1 1 −3 −1 3 1 1 3 3 |
| 20 | 3 3 3 −3 −1 −3 −1 3 −1 1 −1 −3 1 −3 −3 −1 3 3 |
| 21 | 3 −1 3 1 −3 −3 −1 1 −3 −3 3 3 3 1 3 −3 3 −3 |
| 22 | −3 1 1 −3 1 1 3 −3 −1 −3 −1 3 −3 3 −1 −1 −1 −3 |
| 23 | −3 −1 −1 −3 1 −3 3 −1 −1 −3 3 3 −3 −1 3 −1 −1 −1 |
| 24 | −3 −3 −3 1 −3 3 1 1 3 −3 −1 3 −1 3 −3 −3 3 |
| 25 | 1 1 −3 −3 −3 −3 1 3 −3 3 3 1 −3 −1 3 −1 −3 1 |
| 26 | 3 −1 −1 1 −3 −1 −3 −1 −3 −3 −1 −3 1 1 1 −3 −3 3 |
| 27 | 3 1 −3 1 −3 3 3 −1 −3 −3 −1 −3 −3 3 −3 −1 1 3 |
| 28 | −1 −3 1 −3 −3 −3 1 1 3 3 −3 3 3 −3 −1 3 −3 1 |
| 29 | −3 −1 −3 −3 1 1 −1 −3 −1 −3 −1 −1 3 3 −1 3 1 3 |

The set of length-24 sequences can be expressed as:

$$r(n)=e^{j\pi\phi(n)/4}, n=0,1, 2, \ldots, 23$$

where φ(n) is listed in Table-3 below.

In LTE, uplink sequences are grouped into multiple sequence groups for use in wireless communications. For example, each sequence group can include at least two sequences of different lengths, and different sequence

TABLE 3 definition of φ(n) for the length-24 sequences adopted for NR

| i | φ(0), . . . , φ(23) |
|---|---|
| 0  | −1 −3 3 1 1 −3 1 −3 −3 1 −3 −1 −1 3 −3 3 3 3 −3 1 3 3 −3 −3 |
| 1  | −1 −3 3 −1 3 1 3 −1 1 −3 −1 −3 −1 1 3 −3 −1 −3 3 3 3 −3 −3 −3 |
| 2  | −3 3 1 3 −1 1 −3 1 −3 1 −1 −3 −1 −3 −3 −3 −3 −1 −1 −1 1 1 −3 −3 |
| 3  | −3 −1 3 −1 1 −3 1 1 −3 −3 3 −3 −1 −1 −1 −3 −1 1 −3 −1 1 1 −3 −3 |
| 4  | 1 −3 3 −1 −3 −1 3 3 1 −1 1 1 3 −1 −3 −3 −1 3 −3 −1 −3 −3 |
| 5  | 3 −1 1 −1 3 −3 1 1 3 −1 −3 3 1 −3 3 −1 −1 −1 −1 1 −3 −3 −3 −3 |
| 6  | −3 3 −1 3 1 −1 −1 −1 3 3 1 1 1 3 3 1 −3 −3 −1 1 −3 1 3 −3 |
| 7  | −3 −1 1 −3 −3 1 1 −3 3 −1 −1 −3 1 3 1 −1 −3 −1 3 1 −3 3 −3 −3 |
| 8  | −3 1 −3 1 −3 1 −3 1 −3 −3 −3 1 −3 −3 1 1 −3 1 1 −3 −3 |
| 9  | 3 −3 −3 −1 3 3 −3 −1 3 1 1 3 −1 3 −3 −1 3 −1 3 1 −1 −3 −3 |
| 10 | −3 −3 −1 −1 −1 −3 1 −1 −3 −1 3 −3 1 3 −3 3 3 1 −1 −1 1 −3 −3 |
| 11 | −3 −3 3 3 1 −1 −1 −1 1 −3 −1 1 −1 3 −3 −1 −3 −1 −1 1 −3 3 −1 −3 |
| 12 | −3 −3 1 −1 3 3 −3 −1 1 −1 1 1 1 −1 −1 3 1 −3 1 −1 −1 −1 −1 −3 |
| 13 | −3 1 −3 3 −1 −1 −1 −3 3 1 −3 −1 3 −1 1 −1 1 −3 −3 −3 −3 −3 |
| 14 | −3 −3 −3 −1 3 −3 3 1 3 1 −3 −1 −1 −3 1 1 3 1 −1 −3 3 1 3 −3 |
| 15 | 1 1 −1 −3 −1 1 1 −3 1 −1 1 3 −3 −3 3 −1 −3 1 3 −3 1 −3 |
| 16 | −3 3 −1 3 −1 3 3 1 1 −3 1 3 −3 3 −3 −3 −1 1 3 −3 −1 −1 −3 −3 |
| 17 | −1 −3 −3 1 −1 −1 −3 1 3 −1 −3 −1 −3 1 1 3 −1 −3 −1 −1 3 −3 |
| 18 | −3 1 −3 1 −3 1 1 3 1 −3 −3 −1 3 −1 −3 3 1 −1 −3 −3 −3 −3 |
| 19 | 3 −3 3 −1 −3 1 3 1 −1 −1 −3 −1 3 −3 3 −1 −1 3 −3 −3 3 −3 −3 |
| 20 | −3 1 3 −3 −1 3 −3 −1 1 3 −1 1 3 1 −1 −3 1 −3 1 −3 −3 |
| 21 | −3 1 −3 −1 −1 3 1 3 −3 1 3 3 −1 −3 −3 −1 3 −1 −1 −3 −3 −3 3 −3 |
| 22 | −3 −1 −1 −3 1 −3 −3 −1 −1 3 −1 1 −1 3 1 −3 −1 3 1 1 −1 −1 −3 |
| 23 | −3 1 −3 3 −3 1 −3 3 1 −1 −3 −1 −3 −3 −3 1 3 −1 1 3 3 3 −3 |
| 24 | −3 −1 1 −3 −1 −1 1 1 1 3 3 −1 1 −1 1 −1 −3 −3 −3 3 1 −1 −3 |
| 25 | 3 −1 −1 3 −1 −3 −1 −1 −1 3 −1 −1 3 1 1 −3 3 −1 3 3 −3 −3 |
| 26 | −3 1 3 −1 1 −1 3 −3 3 −1 −3 −1 3 −1 −1 −1 −3 −1 −1 −3 3 3 −3 |
| 27 | −3 3 −1 −3 −1 −1 −1 3 −1 3 −3 1 3 −3 3 −3 −1 3 1 1 −1 −3 −3 |
| 28 | −3 1 −1 −3 −3 −1 1 −3 −1 −3 1 1 −1 1 1 3 3 3 −1 1 −1 1 −1 −3 |
| 29 | −1 3 −1 −1 3 3 −1 −1 −1 3 −1 −3 1 3 1 1 −3 −3 −3 −1 −3 −1 −3 −3 | groups can be allocated for use by different cells. In NR, similar sequence grouping and allocation can be adopted. As discussed above, new length-24, length-18, and length-12 sequences have been introduced in NR. Therefore, sequence grouping and allocation for the newly introduced NR sequences is desired. The presently disclosed technology addresses the grouping of the length-24, length-18, and length-12 sequences adopted in NR with other sequences (e.g., certain sequences currently used in LTE), and the use of the newly configured sequence groups in wireless communications.

FIG. 1 shows an exemplary base station and UEs in wireless communications that use PUCCH and/or short PUCCH channels. The base station (120) can transmit channel resources allocated to the plurality of UEs (110a-110c). The UEs (110a-110c) can transmit information using allocated sequences via PUCCH and/or short PUCCH channels (130a-130c) to the base station (120). The presently disclosed technology provides various embodiments of sequence grouping and use in wireless communications between the base station and the UEs.

Short Sequence Grouping

When sequences are used for wireless communications, signal interference between different cells can depend on the correlation between the sequences used. In order to minimize inter-cell interference, it is desirable to have low correlations between sequences used by different cells. In other words, it is desirable to have high cross-correlations between sequences of different lengths that are included in a same group. Accordingly, in some embodiments, the presently disclosed technology includes allocating into a same sequence group sequences that (1) have different lengths and (2) have high cross-correlations between or among themselves. In allocating the newly introduced NR sequences into existing LTE sequence groups, the presently disclosed technology accounts for cross-correlations between these newly introduced sequences and the existing LTE sequences.

Figure 2:
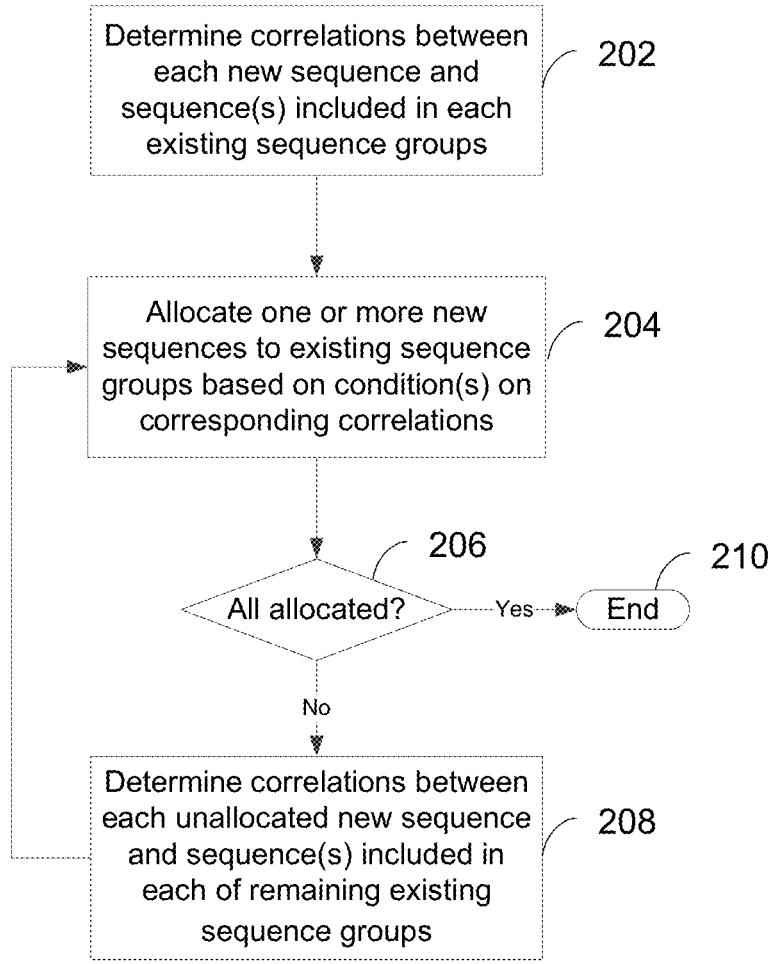
FIG. 2 shows an exemplary flowchart of a method for allocating new sequences into existing sequence groups, in accordance with some embodiments of the presently disclosed technology.

FIG. 2 shows an exemplary flowchart of a method for allocating new sequences (e.g., the newly introduced length-24, length-18, or length-12 NR sequences) into existing sequence groups (e.g., sequence groups currently used in LTE), in accordance with some embodiments of the presently disclosed technology. For purposes of illustration, the newly generated NR sequences that are being allocated are denoted by $S_{1,i}$, where i represents a sequence index selected from 0, 1, 2, ..., 29 and the value of $S_{1,i}$ can be found in Table-1, Table-2, or Table-3 above. Other sequences of length-Y (e.g., currently used in LTE) are denoted by $S_{2,u}$, wherein Y can be 36,48,60 or other multiples of 12 and specific $S_{2,u}$ values can be found in TS36.211. The sequences of $S_{2,u}$ belong to 30 sequence groups, where u represents a sequence group index selected from 0, 1, 2, ..., 29.

Because there are 3 new sets of sequences introduced in NR, in some embodiments, the allocation involves all 3 new sets of NR sequences. For example, the allocation of new length-24 NR sequences can be performed first. When allocating the new length-24 sequences, the existing LTE sequences of length-36,48, 60, or other multiples of 12 can be used as references for cross correlation calculation. After completing the sequence allocation for the new length-24 sequences, allocation of new length-18 sequences can be performed. When allocating the new length-18 sequences, both (1) the new length-24 sequences after re-grouping (i.e., the new length-24 sequences as allocated into the existing sequence groups) and (2) the exiting LTE sequences of length-36,48,60 or other multiples of 12 can be used as references for cross correlation calculation. A similar process can be applied to the allocation of the new length-12 sequences. Illustratively, the new length-18 sequences and new length-24 sequences after re-grouping as well as the exiting LTE sequences of length-36,48,60 or other multiples of 12 can be used as references for length-12 sequences allocation.

With reference to FIG. 2, at block 202, the method includes determining correlations between each new sequence and sequence(s) included in each existing sequence groups. Illustratively, the method includes computing cross correlations between each of the 30 $S_{1,i}$ sequences and the $S_{2,u}$ sequence included in each of the 30 sequence groups. The cross correlation values can be represented in a cross correlation matrix $XCORR_{i,u}$, where each row corresponds to an individual new sequence $S_{1,i}$ and each column corresponds to a sequence $S_{2,u}$ included in an individual sequence group (of group index u).

In various embodiments, cross correlations between the new NR sequence and other existing length-Y base sequences can be calculated. The existing length-Y base sequences used in LTE with Y>=36 can be expressed as:

$$\bar{r}(n) = x_q(n \bmod N_{ZC}^{RS}), 0 \le n < M_{sc}^{RS}$$

where the $q^{th}$ root Zadoff-Chu sequence is defined by $$x_q(m) = e^{-j\frac{\pi q m(m+1)}{N_{ZC}^{RS}}}, 0 \le m \le N_{ZC}^{RS} - 1$$

with q given by $$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31.$$

The length $N_{ZC}^{RS}$ of the Zadoff-Chu sequence is given by the largest prime number such that $N_{ZC}^{RS} < M_{sc}^{RS}$ where $M_{SC}^{RS} = Y$, and v=0 or 1 when Y>=60.

The cross correlation between two sequences can be calculated based on the following equation:

xcorr_coeffs=NFFT*IFFT(Seq1.*conj(Seq2), NFFT)/length(Seq1) (Eq. 1)

where IFFT(X, N) is the N_point Inverse Fourier Transform operation, Seq1 and Seq2 denote the two sequences, conj( )is the complex conjugate operation.

Figures 3A, 3B:
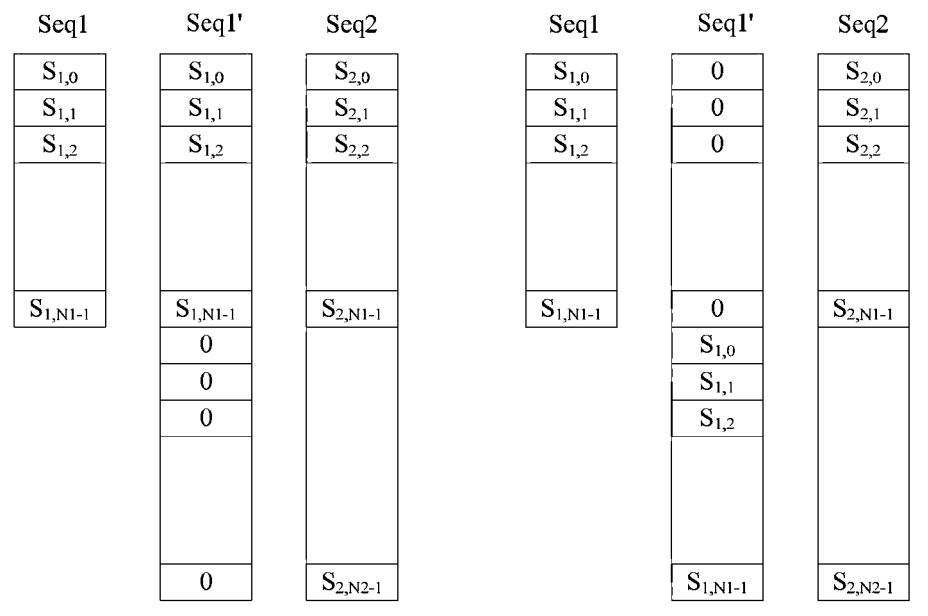

In cases where the length of Seq1 and Seq2 are unequal, zeros padding can be applied to the shorter sequence when performing Seq1.* conj(Seq2) for all possible frequency positions. FIGS. 3A and 3B show two examples of zeros padding application, in accordance with some embodiments of the presently disclosed technology. Seq1 is the sequence of shorter length when using Eq.1 for cross correlation calculation.

In various embodiments, a sequence group includes sequences of different lengths. In some embodiments, the cross correlation between the new NR sequences and existing sequences of all other lengths can be evaluated. In some embodiments, however, the number of the existing sequences of different lengths can be too large. For example, Y can be equal to 12 N with N ranging from 3 to 110. Given limited computation resources, it can be impractical to calculate the cross correlation between the new NR sequences and all the existing sequences. Therefore, in some embodiments, only a selected subset of existing sequences lengths are considered when allocating the new sequences into sequences group. For example, existing sequences of length-36, length-48, length-60, and length-72 are selected as a basis for the new NR sequences allocations.

More specifically, in some embodiments, when allocating the new length-24 sequences, the existing sequences with lengths 36,48,60 and 72 are used. Among which, the cross correlation between the new length-24 sequences and the existing length-36 sequences takes first priority in the sequence allocation process. This is at least partly because the length-36 sequences were used as reference sequences for grouping sequences of other lengths when forming the LTE sequence groups.

When allocating the new length-18 sequences, the existing sequences with lengths 36,48,60,72 and the new length-24 sequences (after re-grouping) are used. Among which, the cross correlation between the new length-18 sequences and the existing length-36 sequences takes first priority in the sequence allocation process. Compared with the length-36 sequences, cross correlations between the new length-18 sequences and sequences of other lengths have lower priorities. In some embodiments, other than the length-36 sequences that correspond to the highest priority, the cross correlation with sequences of a shorter length has a higher priority than with sequences of a longer length. For example, the cross correlation between the new length-18 sequences and the new length-24 sequences (after regrouping) has a higher priority than the cross correlation between the new length-18 sequences and the existing length-48 sequences.

Similarly, when allocating the new length-12 sequences, the existing sequences with lengths 36,48,60, 72, the new length-24 sequences (after regrouping), and the new length-18 sequences (after re-grouping) are used. Among which, the cross correlation with the existing length-36 sequences takes first priority in the sequence allocation process. Then starting from the new length-18 sequences (after regrouping), cross correlations with sequences of increasing lengths take decreasing priorities in the sequence allocation process. That is, cross correlation with the new length-18 sequences (after regrouping) takes second priority, cross correlation with the new length-24 sequences (after regrouping) takes third priority, and so on.

With reference to FIG. 2, at block 204, the method includes allocating one or more new sequences to existing sequence groups based on condition(s) on corresponding correlations. Illustratively, cross correlation values that exceed certain threshold or are relatively large can serve as bases for allocating new sequences to existing groups. In some embodiments, for each new NR sequence $S_{1,i}$, the method includes identifying the maximum cross correlation value within a corresponding row of the cross correlation matrix $XCORR_{i,u}$. A group index $u=umax(i)$ that corresponds to the identified maximum cross correlation value is selected, and the new NR sequence $S_{1,i}$ is allocated to existing sequence group of index $umax(i)$.

In cases where a same group index $umax(i)$ is selected for multiple $S_{1,i}$'s, their corresponding cross correlation values $XCORR_{i,umax(i)}$'s are compared with one another. The new NR sequence $S_{1,i}$ that corresponds the largest $XCORR_{i,umax(i)}$ value is allocated to the existing sequence group of index $umax(i)$, and the remaining NR sequences are labeled as unallocated.

In some embodiments, a threshold can be set as criteria for determining whether a cross correlation value is high or low. Different threshold settings can result in different sequence allocations. When allocating the new length-24, length-18, and length-12 NR sequences, the thresholds can be set to 0.6, 0.7, and 0.8, respectively.

Use the allocation of length-24 NR sequences as an example, the cross correlation threshold is set to 0.6. In this case, the cross correlations between the new length-24 sequences and the existing length-36, length-48, length-60, and length-72 are calculated. For example, the cross correlations can be represented in 4 cross correlation matrices corresponding to the length-36, length-48, length-60, and length-72 sequences, respectively. Table-4 illustrates the group indices $umax(i,L)$ or $umax(i,L,v)$, for which the cross correlation between (1) a new length-24 sequence (of sequence index i) and (2) an existing sequence of length L within the group is higher than 0.6, where $v=0,1$ when L is equal or large than 60.

TABLE 4

| | Sequence pairs having cross correlation higher than 0.6 | | | | | | | | | | | | | | |
|---|---|---|---|---|---|---|---|---|---|---|---|---|---|---|---|
| i | 1 | 4 | 5 | 6 | 7 | 9 | 10 | 15 | 17 | 18 | 21 | 22 | 25 | 26 | 27 |
| umax(i, 36) | | | | 11 | ~~15~~ | | | | | 14 | 15 | 29 | 7 | | |
| umax(i, 60, 0) | | 3 | | 11 | | | | | | | ~~5~~ | 29 | | | ~~15~~ |
| umax(i, 60, 1) | | | ~~15~~ | | | 27 | | | 2 | | | | | | |
| umax(i, 72, 0) | 0 | | | | | 20 | 9 | | | 28 | | 29 | | | |
| umax(i, 72, 1) | | | 21 | | | 27 | | ~~27~~ | | | | | | | |

As illustrated in the second row of Table-4, the cross correlation between new length-24 sequence of sequence index i=7 and existing length-36 sequence of group index u=15 is higher than 0.6. Same is true for new length-24 sequence of sequence index i=22 and existing length-36 sequence of group index u=15. In some embodiments, only one length-24 sequence can be allocated to an individual sequence group. Accordingly, with respect to the sequence group of group index u=15, a further comparison of cross correlation values is performed. As calculated, the cross correlation value is 0.679 for sequence pair (sequence index i=7, group index u=15) and 0.695 for sequence pair (sequence index i=22, group index u=15). Based on the comparison, the larger cross correlation value of 0.695 is selected. Therefore, the length-24 sequence of sequence index i=22 is allocated to sequence group u=15, and the length-24 sequence of index i=7 remains unallocated.

As illustrated in the third row of Table-4, the cross correlation between new length-24 sequence of sequence index i=22 and existing length-60 sequence of group index u=5(v=0) is higher than 0.6. Because the new length-24 sequence of sequence index i=22 has already been allocated to group u=15 according to the cross correlation with length-36 sequences, this new sequence is not allocated to sequence group u=5. In other words, the cross correlation with length-36 sequences has the highest priority in the sequence allocation process.

As illustrated in the fourth column of Table-4, the cross correlation between new length-24 sequence of sequence index i=5 and existing length-60 sequence with of group index u=15 (v=1) is higher than 0.6. Same is true for new length-24 sequence of sequence index i=5 and existing length-72 sequence of group index u=21 (v=1). Because the new length-24 sequence of index i=22 has already been allocated to sequence group u=15 based on the cross correlation between length-24 and length-36 sequences, the new length-24 sequence of index i=5 cannot be allocated to sequence group u=15 anymore. Therefore, the new length-24 sequence of index i=5 is allocated to sequence group u=21. In other words, the cross correlation between sequence length pair of (24,36) has a higher priority than that of (24,60) or (24,72) in some embodiments.

Table-5 illustrated a partial allocation of the new length-24 NR sequences to the existing sequence groups based on the discussions above.

TABLE 5 partial allocation of NR sequences to existing sequence groups

| i | 1 | 4 | 5 | 6 | 9 | 10 | 15 | 17 | 18 | 21 | 22 | 25 | 26 |
|---|---|---|---|---|---|----|----|----|----|----|----|----|----|
| Group index u | 0 | 3 | 21 | 11 | 27 | 20 | 9 | 2 | 28 | 14 | 15 | 29 | 7 |

With continued reference to FIG. 2, at block 206, the method includes determining whether all of the new sequences have been allocated. If so, the method ends at block 210. If not, the method proceeds to block 208. At block 208, the method includes determining correlations between each unallocated new sequence and sequence(s) included in each of the remaining existing sequence groups. This can be achieved in a manner similar to block 202, and new cross correlation matrices (of smaller size) can be generated. Then the method proceeds back to block 204 to continue allocating unallocated new sequence(s) into remaining existing sequence groups.

Sequence Grouping Examples

Using the method of FIG. 2 in accordance with some embodiments, a final result for allocating the new length-24 NR sequences into existing sequence groups based on cross correlation with the length-36, length-48, length-60, and length-72 LTE sequences is illustrated in Table-6 below.

TABLE 6

NR sequence grouping for length-24 NR sequences

| Group index u | Sequence indx i | $\varphi(0), \varphi(1), \ldots, \varphi(23)$ | | | | | | | | | | | | | | | | | | | | | | |
|---|---|---|---|---|---|---|---|---|---|---|---|---|---|---|---|---|---|---|---|---|---|---|---|---|
| 0 | 1 | -1 | -3 | 3 | -1 | 3 | 1 | 3 | -1 | 1 | -3 | -1 | -3 | -1 | 1 | 3 | -3 | -1 | -3 | 3 | 3 | 3 | -3 | -3 | -3 |
| 1 | 24 | -3 | -1 | 1 | -3 | -1 | -1 | 1 | 1 | 1 | 3 | 3 | -1 | 1 | -1 | 1 | -1 | -1 | -3 | -3 | -3 | 3 | 1 | -1 | -3 |
| 2 | 17 | -1 | -3 | -3 | 1 | -1 | -1 | -3 | 1 | 3 | -1 | -3 | -1 | -1 | -3 | 1 | 1 | 3 | 1 | -3 | -1 | -1 | 3 | -3 | -3 |
| 3 | 4 | 1 | -3 | 3 | -1 | -3 | -1 | 3 | 3 | 1 | -1 | 1 | 1 | 3 | -3 | -1 | -3 | -3 | -3 | -1 | 3 | -3 | -1 | -3 | -3 |
| 4 | 20 | -1 | 3 | -3 | -3 | -1 | 3 | -1 | -1 | 1 | 3 | 1 | 3 | -1 | -1 | -3 | 1 | 3 | 1 | -1 | -3 | 1 | -1 | -3 | -3 |
| 5 | 23 | -3 | 1 | -3 | 3 | -3 | 1 | -3 | 3 | 1 | -1 | -3 | -1 | -3 | -3 | -3 | -3 | 1 | 3 | -1 | 1 | 3 | 3 | 3 | -3 |
| 6 | 2 | -3 | 3 | 1 | 3 | -1 | 1 | -3 | 1 | -3 | 1 | -1 | -3 | -1 | -3 | -3 | -3 | -1 | -1 | -1 | 1 | 1 | -3 | -3 | -3 |
| 7 | 26 | -3 | 1 | 3 | -1 | 1 | -1 | 3 | -3 | 3 | -1 | -3 | -1 | -3 | 3 | -1 | -1 | -1 | -3 | -1 | -1 | -3 | 3 | 3 | -3 |
| 8 | 13 | -3 | 1 | -3 | 3 | -1 | -1 | -1 | -3 | 3 | 1 | -1 | -3 | -1 | 1 | 3 | -1 | 1 | -1 | 1 | -3 | -3 | -3 | -3 | -3 |
| 9 | 15 | 1 | 1 | -1 | -3 | -1 | 1 | 1 | -3 | 1 | -1 | 1 | -3 | 3 | -3 | -3 | 3 | -1 | -3 | 1 | 3 | -3 | 1 | -3 | -3 |
| 10 | 14 | -3 | -3 | -3 | -1 | 3 | -3 | 3 | 1 | 3 | 1 | -3 | -1 | -1 | -3 | 1 | 1 | 3 | 1 | -1 | -3 | 3 | 1 | 3 | -3 |
| 11 | 6 | -3 | 3 | -1 | 3 | 1 | -1 | -1 | -1 | 3 | 3 | 1 | 1 | 1 | 3 | 3 | 1 | -3 | -3 | -1 | 1 | -3 | 1 | 3 | -3 |
| 12 | 19 | 3 | -3 | 3 | -1 | -3 | 1 | 3 | 1 | -1 | -1 | -3 | -1 | 3 | -3 | 3 | -1 | -1 | 3 | 3 | -3 | -3 | 3 | -3 | -3 |
| 13 | 16 | -3 | 3 | -1 | 3 | -1 | 3 | 3 | 1 | 1 | -3 | 1 | 3 | -3 | 3 | -3 | -3 | -1 | 1 | 3 | -3 | -1 | -1 | -3 | -3 |
| 14 | 21 | -3 | 1 | -3 | -1 | -1 | 3 | 1 | 3 | -3 | 1 | -1 | 3 | 3 | -1 | -3 | 3 | -3 | -1 | -1 | -3 | -3 | -3 | 3 | -3 |
| 15 | 22 | -3 | -1 | -1 | -3 | 1 | -3 | -3 | -1 | -1 | 3 | -1 | 1 | -1 | 3 | 1 | -3 | -1 | 3 | 1 | 1 | -1 | -1 | -3 | -3 |
| 16 | 12 | -3 | -3 | 1 | -1 | 3 | 3 | -3 | -1 | 1 | -1 | -1 | 1 | 1 | -1 | -1 | 3 | -3 | 1 | -3 | 1 | -1 | -1 | -1 | -3 |
| 17 | 3 | 3 | -1 | 3 | -1 | 1 | -3 | 1 | 1 | -3 | -3 | 3 | -3 | -1 | -1 | -1 | -1 | -1 | -3 | -3 | -1 | 1 | 1 | -3 | -3 |
| 18 | 8 | -3 | 1 | -3 | 1 | -3 | -3 | 1 | -3 | 1 | -3 | -3 | -3 | -3 | -3 | 1 | -3 | -3 | 1 | 1 | -3 | 1 | 1 | -3 | -3 |
| 19 | 11 | -3 | -3 | 3 | 3 | 1 | -1 | -1 | -1 | 1 | -3 | -1 | 1 | -1 | 3 | -3 | -1 | -3 | -1 | -1 | 1 | -3 | 3 | -1 | -3 |
| 20 | 10 | -3 | -3 | -1 | -1 | -1 | -3 | 1 | -1 | -3 | -1 | 3 | -3 | 1 | -3 | 3 | -3 | 3 | 3 | 1 | -1 | -1 | 1 | -3 | -3 |
| 21 | 5 | 3 | -1 | 1 | -1 | 3 | -3 | 1 | 1 | 3 | -1 | -3 | 3 | 1 | -3 | 3 | -1 | -1 | -1 | -1 | 1 | -3 | -3 | -3 | -3 |
| 22 | 29 | -1 | 3 | -1 | -1 | 3 | 3 | -1 | -1 | -1 | 3 | -1 | -3 | 1 | 3 | 1 | 1 | -3 | -3 | -3 | -1 | -3 | -1 | -3 | -3 |
| 23 | 0 | -1 | -3 | 3 | 1 | 1 | -3 | 1 | -3 | -3 | 1 | -3 | -1 | -1 | 3 | -3 | 3 | 3 | 3 | -3 | 1 | -3 | 3 | -3 | -3 |
| 24 | 7 | -3 | -1 | 1 | -3 | -3 | 1 | 1 | -3 | 3 | -1 | -1 | -3 | 1 | 3 | 1 | -1 | -3 | -1 | -3 | 1 | -3 | -3 | -3 | -3 |
| 25 | 27 | -3 | 3 | -1 | -3 | -1 | -1 | -1 | 3 | -1 | -1 | 3 | -3 | -1 | 3 | -3 | 3 | -3 | -1 | 3 | 1 | 1 | -1 | -3 | -3 |
| 26 | 28 | -3 | 1 | -1 | -3 | -3 | -1 | 1 | -3 | -1 | -3 | 1 | 1 | -1 | 1 | 1 | 3 | 3 | 3 | -1 | 1 | -1 | 1 | -1 | -3 |
| 27 | 9 | 3 | -3 | -3 | -1 | 3 | 3 | -3 | -1 | 3 | 1 | 1 | 1 | 3 | -1 | 3 | -3 | -1 | 3 | -1 | 3 | 1 | -1 | -3 | -3 |
| 28 | 18 | -3 | 1 | -3 | 1 | -3 | 1 | 1 | 3 | 1 | -3 | -3 | -1 | 1 | 3 | -1 | 3 | 1 | -1 | -3 | -3 | -3 | -3 | -3 | -3 |
| 29 | 25 | 3 | -3 | -1 | 1 | 3 | -1 | -1 | -3 | -1 | 3 | -1 | -3 | -1 | 3 | -1 | 3 | 1 | -1 | -3 | 3 | -3 | -3 | -3 | -3 |

Using the same method in accordance with some embodiments, a final result for allocating the new length-18 NR sequences into existing sequence groups based on cross correlation with the length-36, length-48, length-60, and length-72 LTE sequences and the length-24 new NR sequences (after grouping in accordance with Table-6) is illustrated in Table-8 below.

TABLE 7

NR sequence grouping for length-18 NR sequences

| Group index u | Sequence indx i | φ(0, φ(1, . . . , φ(17) | | | | | | | | | | | | | | | | | |
|---|---|---|---|---|---|---|---|---|---|---|---|---|---|---|---|---|---|---|---|
| 0 | 6 | -1 | 3 | -1 | -3 | 3 | 1 | -3 | -1 | 3 | -3 | -1 | -1 | 1 | 1 | 1 | -1 | -1 | -1 |
| 1 | 0 | 3 | -3 | 3 | -1 | 1 | -3 | -3 | -1 | -3 | -3 | -1 | -3 | 3 | 1 | -1 | 3 | -3 | 3 |
| 2 | 5 | -3 | -3 | 1 | -3 | 3 | 3 | 3 | -1 | 3 | 1 | 1 | -3 | -3 | 3 | -3 | -1 | -1 | |
| 3 | 12 | -3 | -3 | 3 | 3 | 3 | 1 | -3 | 1 | 3 | 3 | 1 | -3 | -3 | 3 | -1 | -3 | -1 | 1 |
| 4 | 3 | 1 | 1 | -1 | -1 | -3 | -1 | 1 | -3 | -3 | -3 | 1 | -3 | -1 | -1 | 1 | -1 | 3 | 1 |
| 5 | 10 | -3 | -3 | 1 | -1 | -1 | 1 | 1 | -3 | -1 | 3 | 3 | 3 | 3 | -1 | 3 | 1 | 3 | 1 |
| 6 | 13 | -3 | 3 | -1 | 1 | 3 | 1 | -3 | -1 | 1 | 1 | -3 | 1 | 3 | 3 | -1 | -3 | -3 | -3 |
| 7 | 4 | 1 | 1 | -3 | 3 | 3 | 1 | 3 | -3 | 3 | -1 | 1 | 1 | -1 | 1 | -3 | -3 | -1 | 3 |
| 8 | 16 | -3 | -1 | 3 | 3 | -1 | 3 | -1 | -3 | -1 | 1 | -1 | -3 | -1 | -1 | -1 | 3 | 3 | 1 |
| 9 | 21 | 3 | -1 | 3 | 1 | -3 | -3 | -1 | 1 | -3 | -3 | 3 | 3 | 3 | 1 | 3 | -3 | 3 | -3 |
| 10 | 24 | -3 | -3 | -3 | 1 | -3 | 3 | 1 | 1 | 3 | -3 | -3 | 1 | 3 | -1 | 3 | -3 | -3 | 3 |
| 11 | 7 | -3 | 1 | -3 | -3 | 1 | -3 | -3 | 3 | 1 | -3 | -1 | -3 | -3 | -3 | -1 | 1 | 1 | 3 |
| 12 | 29 | -3 | -1 | -3 | -3 | 1 | 1 | -1 | -3 | -1 | -3 | -1 | -1 | 3 | 3 | -1 | 3 | 1 | 3 |
| 13 | 25 | 1 | 1 | -3 | -3 | -3 | -3 | 1 | 3 | -3 | 3 | 3 | 1 | -3 | -1 | 3 | -1 | -3 | 1 |
| 14 | 2 | -3 | 3 | -1 | -3 | -1 | -3 | 1 | 1 | -3 | -3 | -1 | -1 | 3 | -3 | 1 | 3 | 1 | 1 |
| 15 | 15 | -3 | -3 | 3 | 3 | 3 | -1 | -1 | -3 | -1 | -1 | -1 | 3 | 1 | -3 | -3 | -1 | 3 | -1 |
| 16 | 17 | -3 | -1 | -3 | -1 | -3 | 1 | 3 | -3 | -1 | 3 | 3 | 3 | 1 | -1 | -3 | 3 | -1 | -3 |
| 17 | 28 | -1 | -3 | 1 | -3 | -3 | -3 | 1 | 1 | 3 | 3 | -3 | 3 | 3 | -3 | -1 | 3 | -3 | 1 |
| 18 | 14 | -3 | 1 | -3 | -1 | -1 | 3 | 1 | -3 | -3 | -1 | -3 | -3 | -1 | 1 | 1 | 1 | -1 | -1 |
| 19 | 20 | 3 | 3 | 3 | -3 | -1 | -3 | -1 | 3 | -1 | 1 | -1 | -3 | 1 | -3 | -1 | 3 | 3 | 3 |
| 20 | 22 | -3 | 1 | 1 | -3 | 1 | 1 | 3 | -3 | -1 | -3 | 3 | -3 | 3 | -1 | -1 | -1 | -1 | -3 |
| 21 | 18 | -3 | 3 | 1 | -1 | -1 | 3 | -3 | -1 | 1 | 1 | 1 | 1 | 1 | -1 | 3 | -1 | -3 | -1 |
| 22 | 23 | -3 | -1 | -1 | -3 | 1 | -3 | 3 | -1 | -1 | -3 | 3 | 3 | -3 | -1 | 3 | -1 | -1 | -1 |
| 23 | 19 | 3 | -1 | -3 | 1 | -3 | -3 | -3 | 3 | 3 | -1 | 1 | -3 | -1 | 3 | 1 | 1 | 3 | 3 |
| 24 | 1 | 3 | -3 | 1 | 1 | 3 | -1 | 1 | -1 | -1 | -3 | 1 | 1 | -1 | 3 | -3 | 3 | 3 | -1 |
| 25 | 26 | 3 | -1 | -1 | 1 | -3 | -1 | -3 | -1 | -3 | -3 | -1 | -3 | 1 | 1 | 1 | -3 | -3 | 3 |
| 26 | 8 | 1 | -3 | -1 | -3 | 3 | 3 | -1 | -3 | 1 | -3 | -3 | -1 | -3 | -1 | 1 | 3 | 3 | 3 |
| 27 | 11 | -3 | -3 | 3 | 3 | -3 | 1 | 3 | -1 | -3 | 1 | -1 | -3 | 3 | -3 | -1 | -1 | -1 | 3 |
| 28 | 27 | 3 | 1 | -3 | 1 | -3 | 3 | 3 | -1 | -3 | -1 | -3 | -3 | 3 | -3 | -1 | -1 | 1 | 3 |
| 29 | 9 | -3 | 3 | 1 | -1 | -1 | -1 | -1 | 1 | -1 | 3 | 3 | -3 | -1 | 1 | 3 | -1 | 3 | -1 |

Using the same method in accordance with some embodiments, a final result for allocating the new length-12 NR sequences into existing sequence groups based on cross correlation with the length-36, length-48, length-60, and length-72 LTE sequences, the length-24 new NR sequences (after grouping in accordance with Table-6) and the length-18 new NR sequence (after grouping in accordance with Table-7) is illustrated in Table-8 below.

TABLE 8

NR sequence grouping for length-18 NR sequences

| Group index u | Sequence indx i | φ(0), φ(1), . . . , φ(11) | | | | | | | | | | | |
|---|---|---|---|---|---|---|---|---|---|---|---|---|---|
| 0 | 17 | -3 | -1 | -1 | 1 | 3 | 1 | 1 | -1 | 1 | -1 | -3 | 1 |
| 1 | 27 | -3 | 3 | 1 | 3 | -1 | -1 | 1 | 3 | 3 | 3 | 3 | 3 |
| 2 | 24 | -3 | 3 | 3 | 1 | -3 | 3 | -1 | 1 | 3 | -3 | 3 | -3 |
| 3 | 19 | -3 | -3 | 3 | -3 | -1 | 3 | 3 | 3 | -1 | -3 | 1 | -3 |
| 4 | 6 | -3 | -3 | -1 | 3 | 3 | 3 | -3 | 3 | -3 | 1 | -1 | -3 |
| 5 | 2 | -3 | -3 | 1 | -3 | -3 | 3 | -3 | 1 | 1 | 1 | 1 | -3 |
| 6 | 26 | 1 | -1 | 3 | -1 | -1 | -1 | -3 | -1 | 1 | 1 | 1 | -3 |
| 7 | 11 | -1 | -3 | 3 | -1 | -3 | -3 | -3 | -1 | 1 | -1 | 1 | -3 |
| 8 | 5 | -1 | 1 | 1 | -1 | 1 | 3 | 3 | -1 | -1 | -3 | 1 | -3 |
| 9 | 3 | -3 | 3 | 1 | 3 | -3 | 1 | 1 | 1 | 1 | 3 | -3 | 3 |
| 10 | 7 | -3 | 3 | -3 | 3 | 3 | -3 | -1 | -1 | 3 | 3 | 1 | -3 |
| 11 | 15 | -3 | -3 | 3 | 1 | -3 | -3 | -3 | -1 | 3 | -1 | 1 | 3 |
| 12 | 18 | -3 | -1 | 3 | -3 | -3 | -1 | -3 | 1 | -1 | -3 | 3 | 3 |
| 13 | 20 | -3 | 1 | -1 | -1 | 3 | 3 | -3 | -1 | -1 | -3 | -1 | -3 |
| 14 | 23 | -3 | -1 | 3 | 1 | 3 | -1 | -3 | 3 | 1 | 3 | 3 | 1 |
| 15 | 4 | -3 | 1 | 3 | -1 | -1 | -3 | -1 | -1 | 3 | 1 | 1 | -3 |
| 16 | 1 | -1 | -1 | -1 | -1 | 1 | -3 | -1 | 3 | 3 | -1 | -3 | 1 |
| 17 | 22 | -3 | -1 | -1 | -3 | -3 | -1 | 3 | 1 | 3 | -1 | -3 | |
| 18 | 21 | -3 | 1 | 3 | 3 | -1 | -1 | -3 | 3 | 3 | -3 | 3 | -3 |
| 19 | 8 | -3 | -1 | -3 | -1 | -1 | -3 | 3 | 3 | -1 | -1 | 1 | -3 |

TABLE 8-continued

NR sequence grouping for length-18 NR sequences

| Group index u | Sequence indx i | $\varphi(0), \varphi(1), \ldots, \varphi(11)$ | | | | | | | | | | | |
|---|---|---|---|---|---|---|---|---|---|---|---|---|---|
| 20 | 12 | 3 | 1 | 3 | 1 | 3 | −3 | −1 | 1 | 3 | 1 | −1 | −3 |
| 21 | 10 | 1 | 3 | −3 | 1 | 3 | 3 | 3 | 1 | −1 | 1 | −1 | 3 |
| 22 | 9 | −3 | 3 | 3 | 3 | −1 | −3 | −3 | −1 | −3 | 1 | 3 | −3 |
| 23 | 25 | 3 | −1 | −3 | 3 | −3 | −1 | 3 | 3 | 3 | −3 | −1 | −3 |
| 24 | 14 | −3 | −1 | 1 | −3 | 1 | 3 | 3 | 3 | −1 | −3 | 3 | 3 |
| 25 | 29 | −3 | 3 | 1 | −1 | 3 | 3 | −3 | 1 | −1 | 1 | −1 | 1 |
| 26 | 16 | −1 | 1 | 3 | −3 | 1 | −1 | 1 | −1 | −1 | −3 | 1 | −1 |
| 27 | 13 | −3 | −3 | 3 | 3 | 3 | −3 | −1 | 1 | −3 | 3 | 1 | −3 |
| 28 | 0 | 1 | −1 | 3 | 1 | 1 | −1 | −1 | −1 | 1 | 3 | −3 | 1 |
| 29 | 28 | −3 | 3 | 3 | 3 | −3 | −3 | 3 | −1 | −1 | 1 | 3 | −3 |

Various communication nodes (e.g., UE or base station) can use the grouping of new NR sequences, as disclosed herein, for communication with other communication node(s). In LTE, the sequence group number(s) for use by a UE is determined based on a group hopping pattern and a sequence shift pattern, which is known between the base station and UE. The group hopping pattern is cell-specific and the UE can obtain the group hopping pattern based on Cell ID. A same or similar mechanism can be implemented in NR for sequence group based communication.

Alternatively or in addition, sequence group number(s) can be provided from base station to UE, for example, by higher layer signaling through RRC (Radio Resource Control), physical layer signaling through DCI (Downlink Control Information), or the like. Once a sequence group number is determined, the UE can select a suitable sequence from the sequence group for transmission, for example, based on sequence length. Sequence grouping based on the presently disclosed technology can mitigate interference between or among different cells, at least because the cross correlations between the sequences used for different cells are relatively low.

Figure 4:
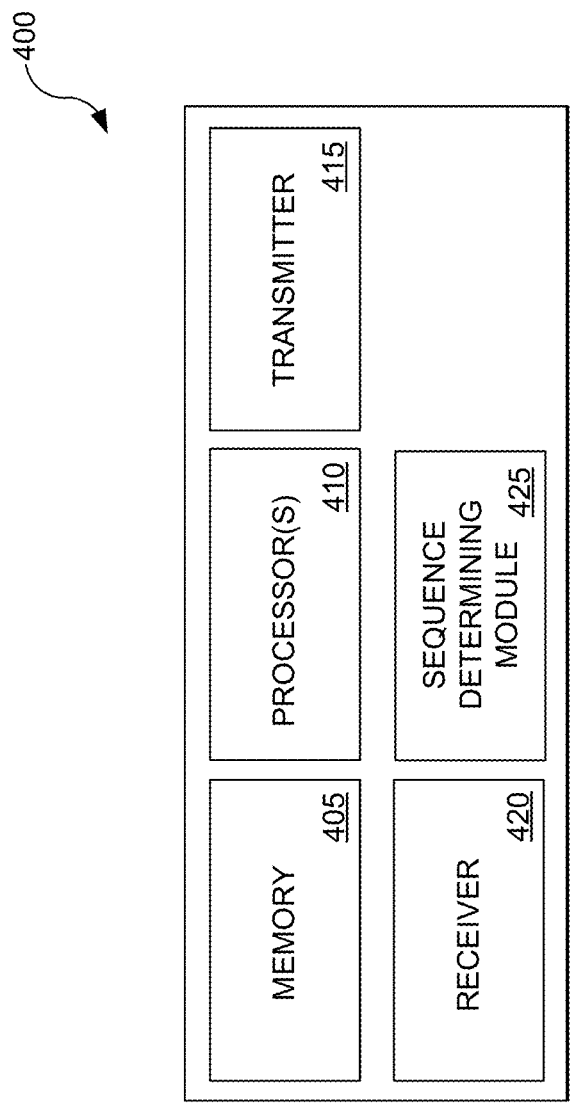
FIG. 4 shows an exemplary block diagram of a UE utilizing sequence groups, in accordance with some embodiments of the presently disclosed technology.

FIG. 4 shows an exemplary block diagram of a UE 400 utilizing sequence groups, in accordance with some embodiments of the presently disclosed technology. The UE 400 includes at least one processor 410 and a memory 405 having instructions stored thereupon. The instructions upon execution by the processor 410 configure the UE 400 to perform several operations using the various modules.

The UE 400 can include a sequence determining module 425. The sequence determining module 425 can determine sequence group(s) for use by the UE (e.g., based on identification of at least a cell, user, or communication channel), select sequence(s) from a sequence group for data transmission based thereon, or perform other sequence determining related functions, in accordance with various embodiments of the presently disclosed technology. The receiver 420 can receive one or more messages (e.g., including information providing or assigning sequence groups to cells), and the transmitter 415 can transmit data (e.g., via short PUCCH to a base station) using one or more sequences selected from sequence group(s) configured in accordance with various embodiments of the presently disclosed technology.

Figure 5:
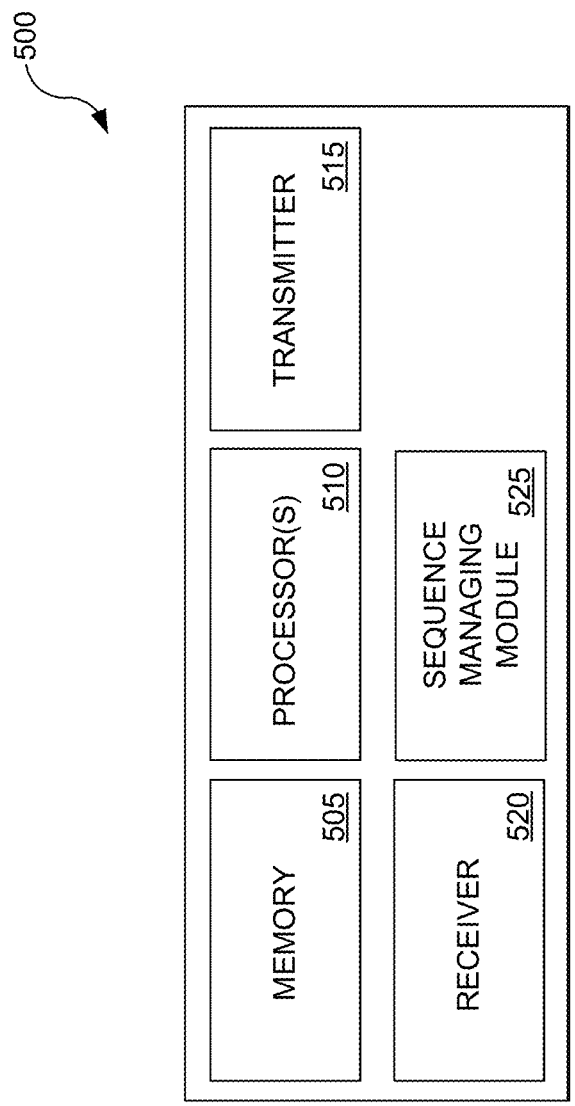
FIG. 5 shows an exemplary block diagram of a base station managing sequence groups, in accordance with some embodiments of the presently disclosed technology.

FIG. 5 shows an exemplary block diagram of a base station 500 managing sequence groups, in accordance with some embodiments of the presently disclosed technology. The base station 500 includes at least one processor 510 and a memory 505 having instructions stored thereupon. The instructions upon execution by the processor 510 configure the base station 500 to perform several operations using the various modules.

The base station 500 can include a sequence managing module 525. The sequence managing module 525 can allocate and group sequences, assign sequence groups to cells, determine sequence group(s) used by UE(s), or perform other sequence related functions, in accordance with various embodiments of the presently disclosed technology. The receiver 520 can receive data transmitted using sequence(s) selected from sequence group(s) that are configured in accordance with various embodiments of the presently disclosed technology, and the transmitter 515 can transmit one or more messages (e.g., for providing or assigning sequence groups to cells) to one or more UEs.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc., that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
determining a group index u of an individual sequence group that includes multiple sequences;
determining, based on the group index u of the individual sequence group, a length-24 target sequence, wherein the length-24 target sequence is a member of a target sequence set, wherein each length-24 target sequence of the target sequence set corresponds to a sequence of the individual sequence group, and wherein the length-24 target sequence corresponds to a mathematical form of $e^{j\pi\varphi(n)/4}$, n=0,1,2, . . . ,23,
wherein, in case u =2, the length-24 target sequence corresponds to $\varphi(n)$=[−1,−3,−3,1,−1,−1,−3,1,3,−1,−3, −1,−1,−3,1,1,3,1,−3,−1,−1,3,−3,−3],
wherein, in case u =6, the length-24 target sequence corresponds to $\varphi(n)$=[−3,3,1,3,−1,1,−3,1,−3,1,−1,−3, −1,−3,−3,−3,−3,−1,−1,−1,1,1,−3,−3],
wherein, in case u =16, the length-24 target sequence corresponds to $\varphi(n)$=[−3,−3,1,−1,3,3,−3,−1,1,−1,−1,1, 1−1,−1,3,−3,1,−3,1,−1,−1,−1,−3],
wherein, in case u =21, the length-24 target sequence corresponds to $\varphi(n)$=[3,−1,1,−1,3,−3,1,1,3,−1,−3,3,1, −3,3,−1,−1,−1,−1,1,−3,−3,−3,−3], and
wherein, in case u =27, the length-24 target sequence corresponds to $\varphi(n)$=[3,−3,−3,−1,3,3,−3,−1,3,1,1,1,3, −1,3,−1,3,−1,3,1,−1,−3,−3], and
transmitting information to or receive information from a wireless communication device based on the length-24 target sequence.

2. The method of claim 1, wherein the wireless communication device is a base station or a terminal device.

3. The method of claim 1, comprising:
determine the target sequence set based on one or more reference sequences having a length that is a multiple of 12, wherein the length comprises at least one of 36, 48, or 60.

4. The method of claim 3, further comprising:
determining that a length-24 sequence is a member of the target sequence set upon determining that a cross correlation value between the length-24 sequence and at least one of the one or more reference sequences is equal to or greater than a threshold.

5. The method of claim 3, comprising:
calculating one or more cross correlation values between a length-24 sequence and the one or more reference sequences; and
determining that the length-24 sequence is a member of the target sequence set by prioritizing a cross correlation value between the length-24 sequence and a first reference sequence of the one or more reference sequences.

6. A method for wireless communication, comprising:
determining a group index u of an individual sequence group that includes multiple sequences;
determining, based on the group index u of the individual sequence group, a length-18 target sequence, wherein the length-18 target sequence is a member of a target sequence set, wherein each length-18 target sequence of the target sequence set corresponds to a sequence of the individual sequence group, and wherein the length-18 target sequence corresponds to a mathematical form of $e^{j\pi\varphi(n)/4}$, n=0,1,2, . . . ,17,
wherein, in case u=3, the length-18 target sequence corresponds to $\varphi(n)$=[−3,3,3,1,−3,1,3,3,1,−3,−3,3,3,−1, −3,−1],
wherein, in case u=7, the length-18 target sequence corresponds to $\varphi(n)$=[1,1,−3,3,3,1,3,−1,−3,−3,3,−1,−1,1, −3,−3,−1,3],
wherein, in case u=10, the length-18 target sequence corresponds to $\varphi(n)$=[−3,−3,−3,1,−3,−3,1,1,3,−3,−3,1, 3,−1,3,−3,−3,3],
wherein, in case u=16, the length-18 target sequence corresponds to $\varphi(n)$=[−3,−1,−3,−1−3,1,3,−3,−1,3,3,3, 1,−1,−3,3,−1,−3],
wherein, in case u=23, the length-18 target sequence corresponds to $\varphi(n)$=[3,−1,−3,1,−3,−3,3,3,−1,1,−3,−1, 3,1,1,3,3], and
wherein, in case u=27, the length-18 target sequence corresponds to $\varphi(n)$=[−3,−3,3,3,−3,1,3,−1,−3,1,−1,−3, 3,−3,−1,−1,3]; and
transmitting information to or receive information from a wireless communication device based on the length-18 target sequence.

7. The method of claim 6, wherein the wireless communication device is a base station or a terminal device.

8. The method of claim 6, comprising:
determine the target sequence set based on one or more reference sequences having a length that is a multiple of 12, wherein the length comprises at least one of 36, 48, or 60.

9. The method of claim 8, further comprising:
determining that a length-18 sequence is a member of the target sequence set upon determining that a cross correlation value between the length-18 sequence and at least one of the one or more reference sequences is equal to or greater than a threshold.

10. The method of claim 8, comprising:
calculating one or more cross correlation values between a length-18 sequence and the one or more reference sequences; and
determining that the length-18 sequence is a member of the target sequence set by prioritizing a cross correlation value between the length-18 sequence and a first reference sequence of the one or more reference sequences.

11. An apparatus for wireless communication, comprising a processor that is configured to:
determine a group index u of an individual sequence group that includes multiple sequences;
determine, based on the group index u of the individual sequence group, a length-24 target sequence, wherein the length-24 target sequence is a member of a target sequence set, wherein each length-24 target sequence of the target sequence set corresponds to a sequence of the individual sequence group, and wherein the length-24 target sequence corresponds to a mathematical form of $e^{j\pi\varphi(n)/4}$, n=0,1,2, . . . ,23
wherein, in case u=2, the length-24 target sequence corresponds to $\varphi(n)$=[−1,−3,−3,1,−1,−1,−3,1,3,−1,−3,−1, −1,−3,1,1,3,1,−3,−1,−1,3,−3,−3],
wherein, in case u=6, the length-24 target sequence corresponds to $\varphi(n)$=[−3,3,1,3,−1,1,−3,1,−3,1,−1,−3,−1, −3,−3,−3,−3,−1,−1,−1,1,1,−3,−3],
wherein, in case u=16, the length-24 target sequence corresponds to $\varphi(n)$=[−3,−3,1,−1,3,3,−3,−1,1,−1,−1,1, 1−1,−1,3,−3,1,−3,1,−1,−1,−1,−3],
wherein, in case u=21, the length-24 target sequence corresponds to $\varphi(n)$=[3,−1,1,−1,3,−3,1,1,3,−1,−3,3,1, −3,3,−1,−1,−1,−1,1,1,−3,−3,−3,−3], and
wherein, in case u=27, the length-24 target sequence corresponds to $\varphi(n)$=[3, −3,−3,−1,3,3,−3,−1,3,1,1,1,3, −1,3,−3,−1,3,−1,3,1,−1,−3,−3]; and
transmit information to or receive information from a wireless communication device based on the length-24 target sequence.

12. The apparatus of claim 11, wherein the wireless communication device is a base station or a terminal device.

13. The apparatus of claim 11, wherein the processor is configured to:
determine the target sequence set based on one or more reference sequences having a length that is a multiple of 12, wherein the length comprises at least one of 36, 48, or 60.

14. The apparatus of claim 13, wherein the processor is configured to:
determine that a length-24 sequence is a member of the target sequence set upon determining that a cross correlation value between the length-24 sequence and at least one of the one or more reference sequences is equal to or greater than a threshold.

15. The apparatus of claim 13, wherein the processor is configured to:
calculate one or more cross correlation values between a length-24 sequence and the one or more reference sequences; and
determine that the length-24 sequence is a member of the target sequence set by prioritizing a cross correlation value between the length-24 sequence and a first reference sequence of the one or more reference sequences.

16. An apparatus for wireless communication, comprising a processor that is configured to:
determine a group index u of an individual sequence group that includes multiple sequences;
determine, based on the group index u of the individual sequence group, a length-18 target sequence, wherein the length-18 target sequence is a member of a target sequence set, wherein each length-18 target sequence of the target sequence set corresponds to a sequence of the individual sequence group, and wherein the length-18 target sequence corresponds to a mathematical form of $e^{j\pi\varphi(n)/4}$, n=0,1,2, . . . ,17
wherein, in case u=3, the length-18 target sequence corresponds to $\varphi(n)$=[−3,−3,3,3,3,1,−3,1,3,3,1,−3,−3,3, −1,−3,−1,1],
wherein, in case u=7, the length-18 target sequence corresponds to $\varphi(n)$=[−1,1,−3,3,3,1,3−3,3,−1,1,1,−1,1, −3,−3,−1,3],
wherein, in case u=10, the length-18 target sequence corresponds to $\varphi(n)$=[−3,−3,−3,1,−3,3,1,1,3,−3,−3,1, 3,−1,3,−3,−3,3],
wherein, in case u=16, the length-18 target sequence corresponds to $\varphi(n)$=[−3,−1,−3,−1,−3,1,3,−3,−1,3,3,3, 1,−1,−3,3,−1,−3,],
wherein, in case u=23, the length-18 target sequence corresponds to $\varphi(n)$=[3, −1,−3,1,−3,−3,−3,3,3,−1,1, −3,−1,3,1,3,3,], and
wherein, in case u=27, the length-18 target sequence corresponds to $\varphi(n)$=[−3, −3,3,−3,1,3,−1,−3,1,−1,−3, 3,−3,−1,−1,−1,3]; and
transmit information to or receive information from a wireless communication device based on the length-18 target sequence.

17. The apparatus of claim 16, wherein the wireless communication device is a base station or a terminal device.

18. The apparatus of claim 16, comprising:
determine the target sequence set based on one or more reference sequences having a length that is a multiple of 12, wherein the length comprises at least one of 36, 48, or 60.

19. The apparatus of claim 18, wherein the processor is configured to:
determine that a length-18 sequence is a member of the target sequence set upon determining that a cross correlation value between the length-18 sequence and at least one of the one or more reference sequences is equal to or greater than a threshold.

20. The apparatus of claim 18, wherein the processor is configured to:
calculate one or more cross correlation values between a length-18 sequence and the one or more reference sequences; and
determine that the length-18 sequence is a member of the target sequence set by prioritizing a cross correlation value between the length-18 sequence and a first reference sequence of the one or more reference sequences.

* * * * *